United States Patent
Kresnyak et al.

(10) Patent No.: US 6,536,523 B1
(45) Date of Patent: Mar. 25, 2003

(54) WATER TREATMENT PROCESS FOR THERMAL HEAVY OIL RECOVERY

(75) Inventors: Steve Kresnyak, Calgary (CA); Alex Braun, Calgary (CA)

(73) Assignees: Aqua Pure Ventures Inc., Alberta (CA); Alberta Energy Company Ltd., Alberta (CA)

( * ) Notice: Subject to any disclaimer, the term of this patent is extended or adjusted under 35 U.S.C. 154(b) by 0 days.

(21) Appl. No.: 09/577,822

(22) Filed: May 25, 2000

Related U.S. Application Data

(63) Continuation-in-part of application No. 09/468,915, filed on Dec. 22, 1999, which is a continuation-in-part of application No. 09/006,499, filed on Jan. 14, 1998, now Pat. No. 6,355,145.
(60) Provisional application No. 60/035,493, filed on Jan. 14, 1997.

(51) Int. Cl.[7] .......................... E21B 43/24; E21B 43/40
(52) U.S. Cl. .................. 166/266; 166/267; 166/272.3; 166/272.7; 166/303; 203/10; 203/25; 203/DIG. 8; 210/747
(58) Field of Search ............. 166/75.12, 90.1, 166/266, 267, 272.1, 272.3, 272.6, 272.7, 303; 203/10, 25, DIG. 8; 210/747

(56) References Cited

U.S. PATENT DOCUMENTS

| | | | |
|---|---|---|---|
| 3,125,072 A | * 3/1964 | Brandt et al. | 166/272.6 |
| 3,186,484 A | * 6/1965 | Waterman | 166/272.3 |
| 3,353,593 A | * 11/1967 | Boberg | 166/252.1 |
| 3,553,100 A | 1/1971 | Jorda et al. | |
| 3,608,638 A | 9/1971 | Terwilliger | |
| 3,637,018 A | 1/1972 | Kelly et al. | |
| 3,644,194 A | 2/1972 | Kelly et al. | |
| 3,648,771 A | 3/1972 | Kelly et al. | |
| 3,660,268 A | 5/1972 | Kelly et al. | |

(List continued on next page.)

*Primary Examiner*—George Suchfield
(74) *Attorney, Agent, or Firm*—McFadden, Fincham

(57) ABSTRACT

There is disclosed a method and apparatus for treating produced water from a heavy oil thermal recovery unit to achieve water recovery and recycle levels of greater than 80% and as high as 100% to achieve zero discharge criteria. The method includes the initial steps of capturing the waste heat energy from the high pressure steam separator located downstream of the steam generators. Further, transferring the heat energy into a heated separator and reboiler exchanger to distill oil reservoir produced water and recover distilled water and a concentrated brine or solid product. The heated separator concentrated stream is circulated through the reboiler exchanger to maintain from 1% to about 50% mass vapour in the stream returning to the heated separator and prevent fouling and scaling. The apparatus includes a low pressure waste energy separator, heated separator and vapour compressor in combination with a forced circulation circuit to generate the distilled water.

14 Claims, 12 Drawing Sheets

U.S. PATENT DOCUMENTS

| | | | |
|---|---|---|---|
| 3,684,699 A | 8/1972 | Vermeulen et al. | |
| 3,800,873 A | 4/1974 | Kelly et al. | |
| 3,802,508 A | 4/1974 | Kelly et al. | |
| 3,888,543 A | 6/1975 | Johns | |
| 3,910,834 A | 10/1975 | Anderson | |
| 3,913,672 A | 10/1975 | Allen et al. | 166/263 |
| 3,917,811 A | 11/1975 | Grout et al. | 423/659 |
| 3,918,521 A * | 11/1975 | Snavely et al. | 166/272.3 |
| 3,948,754 A | 4/1976 | McCollum et al. | |
| 3,948,755 A | 4/1976 | McCollum et al. | |
| 3,954,141 A | 5/1976 | Allen et al. | 166/274 |
| 3,958,830 A | 5/1976 | Johns | |
| 4,004,636 A | 1/1977 | Brown et al. | 166/272 |
| 4,017,377 A | 4/1977 | Fairbanks, Jr. et al. | |
| 4,019,578 A | 4/1977 | Terry et al. | 166/267 |
| 4,029,568 A | 6/1977 | Pittman et al. | |
| 4,046,669 A | 9/1977 | Blaine et al. | |
| 4,057,485 A | 11/1977 | Blaine et al. | |
| 4,057,486 A | 11/1977 | Meadus et al. | |
| 4,068,717 A | 1/1978 | Needham | |
| 4,071,433 A | 1/1978 | Hanson | |
| 4,071,434 A | 1/1978 | Gifford, II | |
| 4,084,938 A | 4/1978 | Willard, Sr. | |
| 4,108,760 A | 8/1978 | Williams et al. | |
| 4,109,715 A | 8/1978 | Adamson | |
| 4,110,194 A | 8/1978 | Peterson et al. | |
| 4,110,195 A | 8/1978 | Harding | |
| 4,114,691 A | 9/1978 | Payton | 166/276 |
| 4,119,149 A * | 10/1978 | Wu et al. | 166/266 |
| 4,133,742 A | 1/1979 | Hill | |
| 4,160,479 A | 7/1979 | Richardson et al. | 166/267 |
| 4,160,720 A | 7/1979 | Seader et al. | |
| 4,161,428 A | 7/1979 | Gottschlich et al. | 196/14.52 |
| 4,240,897 A | 12/1980 | Clarke | |
| 4,242,195 A | 12/1980 | Rudnick | |
| 4,253,938 A | 3/1981 | Roma | |
| 4,329,159 A | 5/1982 | Bull | 55/42 |
| 4,338,185 A | 7/1982 | Noelle | |
| 4,347,119 A | 8/1982 | Thomas | |
| 4,349,633 A | 9/1982 | Worne et al. | 435/281 |
| 4,361,476 A | 11/1982 | Brewer | |
| 4,364,776 A | 12/1982 | McBride et al. | 134/10 |
| 4,368,111 A | 1/1983 | Siefkin et al. | |
| 4,379,489 A | 4/1983 | Rollmann | 166/266 |
| 4,396,491 A | 8/1983 | Stiller et al. | |
| 4,398,603 A * | 8/1983 | Rodwell | 166/267 |
| 4,410,042 A | 10/1983 | Shu | 166/261 |
| 4,413,914 A | 11/1983 | McBride et al. | 366/137 |
| 4,419,214 A | 12/1983 | Balint et al. | 208/8 |
| 4,427,528 A | 1/1984 | Lindörfer et al. | |
| 4,436,710 A | 3/1984 | Miyazaki et al. | 423/552 |
| 4,437,998 A | 3/1984 | Yong | 210/728 |
| 4,458,756 A | 7/1984 | Clark | 166/260 |
| 4,474,011 A * | 10/1984 | Nelson et al. | 166/272.3 |
| 4,475,592 A | 10/1984 | Pachovsky | |
| 4,487,262 A | 12/1984 | Venkatesan | 166/271 |
| 4,487,264 A | 12/1984 | Hyne et al. | 166/300 |
| 4,488,600 A | 12/1984 | Fan | 166/263 |
| 4,498,542 A * | 2/1985 | Eisenhawer et al. | 166/303 |
| 4,498,971 A | 2/1985 | Angelov et al. | |
| 4,501,328 A | 2/1985 | Nichols | 166/288 |
| 4,503,911 A | 3/1985 | Hartman et al. | 166/272 |
| 4,516,636 A | 5/1985 | Doscher | 166/272 |
| 4,518,505 A * | 5/1985 | Lim et al. | 166/303 |
| 4,519,894 A | 5/1985 | Walker | |
| 4,521,292 A | 6/1985 | Spars et al. | |
| 4,565,249 A | 1/1986 | Pebdani | 166/303 |
| 4,566,537 A | 1/1986 | Gussis | 166/261 |
| 4,610,304 A | 9/1986 | Doscher | 166/261 |
| 4,634,520 A | 1/1987 | Angelov et al. | 208/309 |
| 4,635,720 A | 1/1987 | Chew | 166/245 |
| 4,638,864 A | 1/1987 | Bousaid | 166/251 |
| 4,648,962 A | 3/1987 | Capes et al. | 208/188 |
| 4,673,484 A | 6/1987 | Babcock et al. | 208/435 |
| 4,688,550 A | 8/1987 | Lopes | 126/378 |
| 4,702,487 A | 10/1987 | Stoian et al. | 208/390 |
| 4,719,008 A | 1/1988 | Sparks et al. | 208/390 |
| 4,757,618 A | 7/1988 | Mihalov | 34/73 |
| 4,762,812 A | 8/1988 | Lopez et al. | 502/26 |
| 4,783,268 A | 11/1988 | Leung | 210/703 |
| 4,822,481 A | 4/1989 | Taylor | 208/390 |
| 4,846,275 A | 7/1989 | McKay | 166/272 |
| 4,913,236 A * | 4/1990 | Reed | 166/272.3 |
| 4,929,341 A | 5/1990 | Thirumalachar et al. | 208/390 |
| 4,966,685 A | 10/1990 | Hall et al. | 208/390 |
| 4,969,520 A * | 11/1990 | Jan et al. | 166/266 |
| 4,994,174 A | 2/1991 | Künstle et al. | 208/417 |
| 5,000,872 A | 3/1991 | Olah | 252/314 |
| 5,024,676 A | 6/1991 | Moriyama et al. | 44/301 |
| 5,056,596 A | 10/1991 | McKay et al. | 166/272 |
| 5,096,567 A | 3/1992 | Paspek, Jr. et al. | 208/106 |
| 5,145,002 A | 9/1992 | McKay | 166/272 |
| 5,152,886 A | 10/1992 | Paris-Marcano | 208/390 |
| 5,223,148 A | 6/1993 | Tipman et al. | 210/744 |
| 5,249,844 A | 10/1993 | Gronseth | 299/17 |
| 5,320,746 A | 6/1994 | Green et al. | 208/391 |
| 5,411,558 A | 5/1995 | Taniguchi et al. | 44/301 |
| 5,437,693 A | 8/1995 | Iizuka et al. | 44/302 |
| 5,480,566 A | 1/1996 | Strand | 210/772 |
| 5,492,628 A | 2/1996 | Schutte | 210/696 |
| 5,681,452 A | 10/1997 | Kirkbride | 208/390 |
| 5,746,932 A | 5/1998 | Rendall et al. | 252/62 |
| 5,762,780 A | 6/1998 | Rendall et al. | 208/391 |
| 5,772,127 A | 6/1998 | Maciejewski et al. | 241/21 |
| 5,795,444 A | 8/1998 | Rendall et al. | 196/46.1 |
| 5,816,790 A | 10/1998 | Ichinose et al. | 431/4 |
| 5,826,655 A | 10/1998 | Snow et al. | 166/272.3 |
| 5,846,314 A | 12/1998 | Golley | 106/705 |
| 5,868,202 A | 2/1999 | Hsu | 166/256 |
| 5,871,053 A | 2/1999 | Stern | 166/401 |
| 5,876,592 A | 3/1999 | Tipman et al. | 208/390 |
| 5,902,554 A | 5/1999 | Kirkbride | 422/141 |
| 5,928,495 A | 7/1999 | Legkow | 208/13 |
| 5,942,469 A | 8/1999 | Juprasert et al. | 507/202 |
| 5,948,242 A | 9/1999 | Ohsol et al. | 208/181 |
| 5,957,202 A | 9/1999 | Huang | 166/272.3 |
| 5,961,821 A | 10/1999 | Varadaraj et al. | 208/263 |
| 5,979,549 A * | 11/1999 | Meeks | 166/303 |
| 5,989,436 A | 11/1999 | Suzumura et al. | 210/708 |
| 5,998,640 A | 12/1999 | Haefele et al. | 554/12 |
| 6,004,455 A | 12/1999 | Rendall | 208/390 |
| 6,016,868 A * | 1/2000 | Gregoli et al. | 166/261 |
| 6,027,056 A | 2/2000 | Maciejewski et al. | 241/62 |
| 6,030,424 A | 2/2000 | Matsumoto | 44/301 |
| 6,036,473 A | 3/2000 | Ichinose et al. | 431/4 |
| 6,056,050 A | 5/2000 | Snow et al. | 166/57 |
| 6,289,988 B1 * | 9/2001 | Myers et al. | 166/267 |

* cited by examiner

WATER TREATMENT PROCESS FOR THERMAL HEAVY OIL RECOVERY

This is a continuation-in-part of U.S. patent application Ser. No. 09/468,915 filed Dec. 22, 1999, which in turn is a continuation-in-part of U.S. patent application Ser. No. 09/006,499, filed Jan. 14, 1998, now U.S. Pat. No. 6,355,145 pending which claims the benefit of United States Provisional Patent Application No. 60/035,493 filed Jan. 14, 1997.

FIELD OF THE INVENTION

The present invention is directed to a highly efficient water distillation process and an apparatus thereof and more particularly, the present invention is directed to a highly efficient water distillation process used in the thermal recovery of heavy oil which minimizes fouling and scaling of operating equipment over long periods of operation.

BACKGROUND OF THE INVENTION

Throughout the many regions in the world, heavy oil, a hydrocarbon material having much higher viscosity or lower API gravity (less than 20° API, typically 7° to 12° API) than conventional petroleum crude, is more difficult to recover and requires enhanced thermal stimulation techniques of the subsurface reservoir to produce. More particularly, in areas of Western Canada heavy oil producers use a technique of injecting high pressure steam into the reservoir at typical pressures of about 1,500 to 3,000 psig, and in some cases as low as 150 psig. The steam heat energy is generated by an apparatus known as a steam generator to a 60 to 80% steam quality and injected into vertical or horizontal well arrangements to reduce the heavy oil viscosity. The flowable heavy oil is collected in adjacent producing wells and a combination of heavy oil, oil/water emulsion, condensed steam and formation brackish water (known as produced water) is produced to the surface. Using surface facilities, heavy oil is separated from the production fluids and recovered for commercial sale. The produced water, typically recovered at water/oil ratios of 2 to 5, is currently disposed of in subsurface disposal wells. Makeup water from an authorized ground water source is used to makeup the steam generator feed water demand. Typically the makeup water receives minimum treatment to reduce hardness and silica compounds to avoid scaling of the steam generator heat exchange surfaces and prevent a safety hazard. In some facilities, the concentrated brine water from the steam generator discharge is separated from the reservoir injection steam and disposed of in suitable deep disposal wells. This concentrated brine water can also be referred to as high pressure blowdown. This prevents excess and unnecessary hot water from being injected into the reservoir during the steam stimulation operation. Typical current heavy oil recovery practices using the steam injection technique are referred to as Cyclic Steam Stimulation (CCS or Huff n' Puff), Steam Assisted Gravity Drained (SAGD) and Steam Assisted Gas Pushed (SAGP) methods.

Public and regulatory pressures require that heavy oil producers implement water recovery and reuse practices and in some facilities a zero effluent discharge is required. This means that 100% of the water used be recovered and reused and the elimination of offsite disposal of effluent streams. The produced water, recovered from the oil separation facility and the HP (high pressure) steam separators, contains hardness components, dissolved and suspended silica and colloidal compounds (clay) and dissolved solids such as sodium chloride. If this brackish water is recycled without treatment, the operation of the steam generators is at risk due to fouling and scaling.

A further problem encountered with the current heavy oil recovery practices using steam injection, is that as the operating temperatures of producing reservoirs are increased from 230° F. to greater than 400° F. to enhance the heavy oil recovery, the temperature of the recovered production fluids (oil and water) increase. To facilitate the common practice of atmospheric oil and water separation, significant quantities of steam is created when the fluid pressure is reduced. This steam is typically condensed by an external means, such as an air cooler to recover the condensed water. The heat energy of the condensing steam is discharged to the atmosphere and wasted.

Until the advent of the present invention combining the recovery of waste heat energy with a highly efficient and non-scaling water distillation process, the recycle of heavy oil produced water and concentrated brine disposal streams has been technically and commercially restricted.

Generally speaking, water distillation is a highly effective method of vaporizing a pure water distillate and recovering a concentrated liquid or solid containing a large quantity of non-volatile components. This process method can be an effective means to recover clean pure water from contaminated sources. However, water distillation processes typically have several problems not the least of which can be fouling or scaling of the apparatus with minerals or other components from the fluid being distilled. Common scaling compounds consist of calcium, magnesium and silicon. Fouling, or to a greater extent, scaling of the heat transfer surfaces have a detrimental effect on the capacity of the heat transfer components, causing conventional distillation processes to become inoperable.

In the prior art, Tsuruta, in U.S. Pat. No. 4,566,947, issued Jan. 28, 1986, taught a general distillation process, but did not recognize the key factors necessary for the prevention of fouling or the applicability of the process for treating produced water from heavy oil recovery. The most important passage in the Tsuruta reference is at column 7, beginning at line 55, with respect to FIG. 4, which states:

"The method which employs a vapor compressor 307 in this manner is advantageous in a case where the feed liquid gives rise to precipitation of solid upon condensation of its volatile component or clogging with pitch-like material which would cause dangerous accidents or troublesome maintenance and service of the compressor. With the above-described arrangement, only the vapor from the evaporator passes the compressor 307, thus preventing the occurrence of such troubles. The interiors of the line 350 and the reboiler 352 can be maintained in a clean state by the use of a suitable washing means. The foregoing method is advantageous especially when the bottom liquid is water, since it is possible to replenish through the line 353 cheap process water which does not require recovery. When the water which is collected at the tower bottom of 306 does not contain substances which foul the inside of the compressor 307, it may be fed to the evaporator though the line 353 to keep the liquid level in the evaporator constant."

FIG. 4 of Tsuruta has been reproduced hereinbelow as well as an additional figure, (Revised FIG. 4), which substantially corresponds to FIG. 4 of Tsuruta, which incorporates Applicant's apparatus to effect its method.

As is evident from a review of FIG. 4 from the Tsuruta reference, if a forced circulation reboiler circuit were added to U.S. '947 and a specific vapor ratio defined, the bottom liquid water would contain fouling substances and operate without fouling or scaling the heated surfaces.

In the FIG. 4 illustration of Tsuruta, lines 340 and 353 are not connected. There is no connection from bottom 306 to line 353. Section 306 in the tower is defined as the tower bottom containing bottom liquid with a pre determined ammonia concentration. Tsuruta highlights the fact that the method is advantageous especially when the bottom liquid is water.

Tsuruta clearly states, in the passage noted above and to which emphasis has been added, that as long as the water which is collected in the bottom of the tower does not contain substances which foul, the water may be fed to the evaporator. The instant application is unconcerned as to the nature of the feed stream for fouling the evaporator. The water contaminated with contaminants can be fed directly to the evaporator without any fear or fouling or other damage to the heat exchanger. In effect, this is an exact opposite to what Tsuruta teaches. By consideration of the circuit loop in FIG. 4 of Tsuruta, all of the heated surfaces related to the bottoms liquid in the apparatus never come in contact with anything other than water substantially free of fouling contaminants, which water is used as the primary medium for stripping ammonia out of a mixture of ammonia and water. There is a teaching in Tsuruta in column 3, at lines 19 through 23, it is stated that the bottom liquid in the tower 1 is sent to the reboiler through line 34, the heated bottoms liquid through line 35. Further still, line 20 indicates that the bottoms is heated by receipt of the heat of condensation of the compressed vapor. After an extensive review of the disclosure, there does not appear to be any mention of a vapor or vapor liquid ratio.

If one combines the teachings from column 7, outlined above together with those in column 3, the only result is that the apparatus will foul. Tsuruta, by the combination of these teachings presents information which can only lead to the apparatus fouling. By contrast, the technologies herein effectively provides for a system which can take a contaminant loaded feed stream containing water and deliver this to the apparatus without any fear of fouling the exchanger surface.

This is possible in view of the recognition of nucleate boiling and the importance of this physical phenomenon in maintaining a wetted surface in a circuit containing a heat exchanger. As is known, the nucleate boiling regime for a pool of water at atmospheric pressure is a fairly specific area where individual bubbles form. This has been established in the references *Principles of Heat Transfer*, Third Edition, Frank Kreith; and, and *Heat Transfer*, Seventh Edition, J. P. Holman.

From the reference *Principles of Heat Transfer*, page 498 provides a discussion concerning stable film and nucleate boiling. In this passage, FIG. 10-2 is referenced as illustrating nucleate boiling. It is evident that individual bubbles are formed on the wire illustrated in the figure. This phenomenon is also illustrated in FIG. 9-5 on page 520 of the second reference, *Heat Transfer*. In this reference, the author actually acknowledges on page 519, that there is considerable controversy concerning the mechanism of nucleate boiling. It has been recognized in the instant case the importance of maintaining nucleate boiling. This concept is important to retain a wetted surface on the heat exchanger and this is what facilitates a feed stream containing any fouling contaminants from coming into contact with the heat exchange surface without any risk of fouling. At vapor fractions of greater than 50%, the heat exchanger will effectively become clogged.

The technology set forth herein provides for treatment of a feed stream containing fouling contaminants. The fouling contaminants in the feed stream can come in direct contact with the heat exchanger surface without any fouling. This latter feature is not possible by Tsuruta's own admissions. This passage has been set forth above. It is the recognition of the aforementioned principles involved that allows this method to achieve desirable results. Tsuruta is simply not applicable to this invention.

Another common problem with typical water distillation processes is that of the high energy input requirements. Without a source of waste heat energy and a means to effectively recover this input energy, the energy required is equivalent to the latent heat of vaporization of water at a given pressure/temperature. Water distillation, under this condition is not commercially viable forwater remediation applications. Heavy oil producing facilities commonly consist of high energy related fluid streams suitable as sources forwaste heat energy recovery.

Several variables must be considered to overcome the problems with conventional distillation methods. The following three equations describe the basic heat transfer relationships within a water distillation system:

$$Q_{(total)} = U*A*LMTD \quad (1)$$
$$Q_{(sensible\ heat)} = m*CP*(T1 - T2) \quad (2)$$
$$Q_{(latent\ heat)} = m*L \quad (3)$$

where

- Q = quantity of heat transferred (BTU $hr^{-1}$)
- U = overall heat transfer coefficient or ability of system to transfer heat (BTU $hr^{-1}$ $ft^{-2}$ $F^{-1}$)
- A = heat transfer surface area ($ft^2$)
- LMTD = log mean temperature difference or the thermal drive of the system (F)
- m = mass flow of fluid in liquid or vapor state (lb $hr^{-1}$)
- Cp = fluid specific heat (BTU $hr^{-1}$ $F^{-1}$)
- T1,T2 = temperature of fluid entering or exiting system (F)
- L = latent heat of vaporization or condensation (BTU $lb^{-1}$)

In order to have an efficient distillation system, the quantity of heat exchanged and recovered, Q, expressed by the above stated equations, must be maximized, while at the same time obeying the practical limits for the remaining variables and preventing scaling and fouling. For a given fluid and fluid dynamics within a given heat exchange apparatus, the variables, U, Cp and L are relatively non-variable. Therefore, careful consideration must be given to the variables A, Q/A, LMTD, m, and T1 & T2 to overcome the problems associated with distillation of contaminated water.

To fully overcome the problems related to distilling contaminated water from a heavy oil thermal recovery facility and eliminate scaling, other essential factors must be considered beyond the basic equations stated above:

- transforming effective sources of waste heat energy;
- the rate by which the heat is transferred within the distillation system, known as heat flux or $QA^{-1}$ (Btu $hr^{-1}$ $ft^{-2}$)
- the level of contaminates in the concentrate;
- the final boiling point of the concentrate relative to the saturation temperature of the vapor stream;
- the degree of supersaturation and level of precipitation of the concentrate; and
- level of vaporization of the evaporating stream.

Until the advent of the present invention, effectively recovering waste heat energy from a heavy oil facility and maximizing the quantity of heat transferred and recovered with a water distillation process, without the tendency of fouling or scaling, could not be realized over a long term continuous period.

A process has been developed which is both energy efficient and eliminates the problems of scaling previously encountered in the distillation of contaminated water, contaminated with organics, inorganics, metals, inter alia.

SUMMARY OF THE INVENTION

The invention further advances the concepts established in the initial application. Former concepts linked two distinct concepts, consisting of distillation or multiple effect water distillation using vapour recompression and waste heat recovery in combination with a unique heat recovery circuit. It has been found by further combining the recovery of a low grade heat energy source from a heavy oil thermal recovery unit together with a uniquely configured forced convection heat recovery and transfer circuit, that very desirable results can be obtained in terms of maximizing heat transfer, eliminating or minimizing compression power requirements and maintaining the desired forced convection circuit non-conductive to scaling exchangers, which is typically encountered by practicing standard distillation methods.

It has now been found that the use of the waste steam energy from the heavy oil recovery unit can be recovered in the heat transfer circuit and this source of low grade energy, most commonly discharged as excess energy or unrecoverable energy, is employed to reduce or eliminate the quantity of requisite compression to treat waste water and significantly reduce the commercial benefits of the process.

By this methodology, a source of waste energy is available in the HP blowdown liquid from the HP steam separator, which is flashed to low pressure to form low grade steam and hot brine water at about 10 to 15 psig. The LP (low pressure) steam is used in the heated separator as the thermal source to evaporate off distilled water, which further condenses to high quality boiler feed water. The hot concentrated blowdown is used to preheat the inlet produced water feed stream prior to entering the heated separator.

Further, a significant source of waste energy is available from the depressurizing of production fluids returning from the heavy oil reservoir. The production fluids returning from the heavy oil reservoir at, typically 50 to 300 psig, are depressurized to near atmospheric in a degassing separator. The oil/water production fluids are transferred to the conventional atmospheric oil/water separation facility, commonly known to those skilled in the art. Waste energy can be extracted by two methods. If lift gas is not used in the heavy oil recovery operation and only a minimal quantity of associated gas is present in the production fluids after the well head, waste steam is separated off the degassing vessel and delivered to the high efficiency distillation unit for waste heat energy recovery. If lift gas is used in the well bore to assist with the production of the heavy oil, and/or there is a relatively high level of associated gas present in the production fluids, then the waste heat energy can be recovered using any suitable heat exchange means and transferred by way of a heat medium fluid to the high efficiency distillation unit for waste heat recovery. In this example, the cooled production fluids are degassed in the degassing vessel without appreciable steam losses. The current state of the art for thermal stimulation techniques is to drive the reservoir harder to enhance heavy oil recovery, thereby resulting in higher production fluid temperatures at the producing well heads. These temperatures are reaching levels beyond the typical 230° F. to 400° F. and even 500° F. Therefore, significant recoverable waste heat energy is available as a source for the high efficiency water distillation unit.

One object of the present invention is to provide an improved efficient produced water recovery process for distilling water containing organic, inorganic, metals or other contaminant compounds with the result being a purified water fraction devoid of the contaminants which additionally does not involve any scaling of the distillation apparatus.

A further object of one embodiment of the present invention is to provide a method of recovering energy for treating water used in heavy oil recovery in a reservoir containing heavy oil and water comprising in combination, the steps of:
 a) providing a water feed stream;
 b) treating the water feed stream to generate a steam fraction and a liquid fraction;
 c) providing a steam separator for separating the steam fraction and the liquid fraction;
 d) separating the steam fraction and the liquid fraction;
 e) providing an oil-water separator and a water distillation apparatus;
 f) injecting the reservoir with the steam fraction;
 g) collecting heavy oil and produced water from the reservoir in the oil-water separator;
 h) separating the heavy oil and produced water from the separator;
 i) providing thermal energy contained in the liquid fraction to the water distillation apparatus; and
 j) treating the produced water with the water distillation apparatus.

An even further object of one embodiment of the present invention is to a method of recovering energy for treating water used in heavy oil recovery in a reservoir containing heavy oil and water, comprising in combination, the steps of:
 a) providing a water feed stream;
 b) treating the water feed stream to generate a steam fraction and a liquid fraction;
 c) providing a steam separator for separating the steam fraction and the liquid fraction;
 d) separating the steam fraction and the liquid fraction;
 e) providing an oil-water separator and a water distillation apparatus;
 f) injecting the reservoir with the steam fraction;
 g) depressurizing heavy oil, produced water to form steam exiting from the reservoir;
 h) transferring energy contained in the steam to the water distillation apparatus; and
 i) separating the heavy oil and produced water.

An even still further object of one embodiment of the present invention is to a method of recovering energy for treating water used in heavy oil recovery in a reservoir containing heavy oil and water, comprising in combination, the steps of:
 a) providing a water feed stream;
 b) treating the water feed stream to generate a steam fraction and a liquid fraction;
 c) providing a steam separator for separating the steam fraction and the liquid fraction;
 d) separating the steam fraction and the liquid fraction;

e) providing an oil-water separator and a water distillation apparatus;

f) injecting the reservoir with the steam fraction;

g) recovering heat energy from the heavy oil and produced water exiting the reservoir with heat exchange means;

h) separating the heavy oil and produced water;

i) providing thermal energy from the heat exchange apparatus to the distillation apparatus j) providing thermal energy contained in the liquid fraction to the water distillation apparatus; and k) treating the produced water with the water distillation apparatus.

A still further object of one embodiment of the present invention is to provide a method of recovering energy from a heavy oil recovery facility where the heavy oil is contained in a reservoir, the energy for the treatment of water produced from heavy oil recovery, the method comprising, the steps of:

a) providing a source of steam having a steam fraction and a liquid fraction;

b) providing an oil-water separator and a water distillation apparatus;

c) injecting the reservoir with at least one fraction of the steam fraction and the liquid fraction to recover the heavy oil;

d) collecting heavy oil and water from the reservoir in the oil-water separator;

e) separating the heavy oil and produced water from the separator;

f) providing thermal energy contained in the liquid fraction to the water distillation apparatus; and g. treating the produced water with the water distillation apparatus.

It has been found that by precisely controlling the ratio of circulating mass in a range of less than 300 to near two times that of the vapor fraction exiting the reboiler, several desirable advantages can be realized:

1. The circulating concentrate through the evaporating side of the reboiler will contain a precisely controlled vapor fraction near 1% to 50% of the mass of the circulating concentrate;

2. By precisely controlling this vapor fraction, the temperature rise of the circulating concentrate remains very low (about 1F) and reboiler heat exchange surfaces remain wetted, at a temperature near that of the circulating concentrated fluid. This reduces the risk of fouling of these surfaces;

3. With this controlled low vapor fraction, the concentrated fluid within the exchanger is subjected to a greatly reduced localized concentration factor of less than 1.1, avoiding localized precipitation of scaling compounds on the exchanger surfaces;

4. As the vapor mass is formed toward the exit of the reboiler, the stream velocities within the exchange passages increase significantly promoting good mixing and thus reducing the risk of fouling;

5. By allowing a controlled vapor fraction in the evaporating fluid, significant heat transfer can be realized through the means of latent heat, without scaling and causing a temperature cross within the heat exchanger;

6. Because the temperature rise of the evaporating side of the reboiler is kept very low, the LMTD of the reboiler is maintained, thereby keeping the input energy requirement very low;

7. By adjusting the heat flux, the temperature of the wet surfaces for condensing and evaporating are maintained near that of the saturated steam condition at the evaporating and condensing conditions. The type of boiling experienced will range from primarily forced convection to stable nucleate boiling off the wetted surfaces; and 8. By providing a reboiling means to absorb low grade waste heat energy from a heavy oil recovery facility, the power required for compression is eliminated, provided sufficient high pressure blowdown is available.

A further object of one embodiment of the present invention is to provide a method of recovering energy from heavy oil treatment for treatment of water produced from the heavy oil recovery, comprising the steps of:

a) providing a high pressure blowdown stream;

b) flashing the high pressure blowdown stream to form a low pressure waste energy stream and concentrated blowdown stream;

c) vaporizing at least a portion of the produced water with the low pressure waste energy stream;

d) preheating the produced water with the concentrated blowdown stream;

e) providing a fluid circuit including a heated separator and a reboiler exchanger in communication;

f) providing a vapor circuit including the heated separator, compressor means and the reboiler exchanger in communication;

g) passing preheated produced water into the heated separator;

h) vaporizing the preheated produced water with the low pressure waste energy and a compressed vapor stream in the reboiler exchanger to generate a vapor fraction and concentrate liquid fraction;

i) treating the vapor fraction formed by the low pressure waste energy with an external condenser means;

j) recovering any remaining portion of the vapor fraction by the compressor means;

k) circulating at least a portion of the concentrate liquid fraction through the reboiler exchanger and the heated separator to maintain a ratio of mass of concentrate to vapor fraction of 300 to near 2 to result in a vapor fraction of near 1% by mass to less than 50% by mass exiting the reboiler exchanger to prevent fouling and scaling in the reboiler exchanger; and l) collecting the condensed vapor fraction and the waste energy stream substantially devoid of contaminants.

As further advantages to this methodology, the input costs are effectively zero. This is due to the fact that if sufficient low grade waste energy can be made available, there is no requirement for a compressor to treat the produced water. Further still, the method protocol facilitates 100% water recovery and results in a zero waste water effluent solution since the contaminants are converted to solid waste.

Broadly, in one possible embodiment, distilled water is evaporated and passed through a mesh pad to remove any entrained droplets, where it is externally condensed. The waste energy stream enters the reboiler where it is condensed to distillate. The heat energy is transferred to the circulating concentrate from the heated separator where, byway of controlling the mass of circulating concentrate to vapor stream, to a range of less than 300 to near 2, less than 50% vapor or more precisely less than 10% vapor, is generated in the circulating concentrate stream. This vapor formed in the circulating concentrate stream absorbs the transferred heat by latent heat of vaporization, while at the same time not allowing the temperature rise on the circulating concentrate to increase greater than about 1° F. The clean distillate water, collected from the external condenser and the reboiler exchanger at condensing temperature and pressure, is returned as high quality steam generator feed water. Simultaneously, a portion of the concentrate stream is removed from the heated separator to control the desired concentration of the non-volatile contaminants. This concentrate blowdown stream at the heated separator temperature and pressure is passed through a preheater to impart the remaining sensible heat energy to the produced water feed stream. Additional pre- and post-treatment techniques can be employed as batch or continuous process methods to remove or contain contaminants, prior to, after or during the distillation operation. Methods of pH control or other chemical additions can be used to ionize volatile components or alter solubility conditions in the concentrate to further enhance the subject distillation process. A substantially high level of distilled water can be recovered, typically in excess of 90% of the water feed stream. With the further addition of a crystallization means, 100% water recovery can be achieved.

In terms of the breadth for this process, the same could be easily employed to any heavy oil recovery operation using steam for thermal stimulation, such as conventional steam flood, cyclic steam stimulation (CSS or Huff n' Puff), steam assisted gravity drain (SAGD) and steam and gas pushed (SAGP). This listing is by no means exhaustive, but rather exemplary.

Having thus described the invention, reference will now be made to the accompanying drawings illustrating the preferred embodiments.

BRIEF DESCRIPTION OF THE DRAWINGS

Similar numerals employed in the text denote similar elements.

DETAILED DESCRIPTION OF THE PREFERRED EMBODIMENTS

Figure 1:
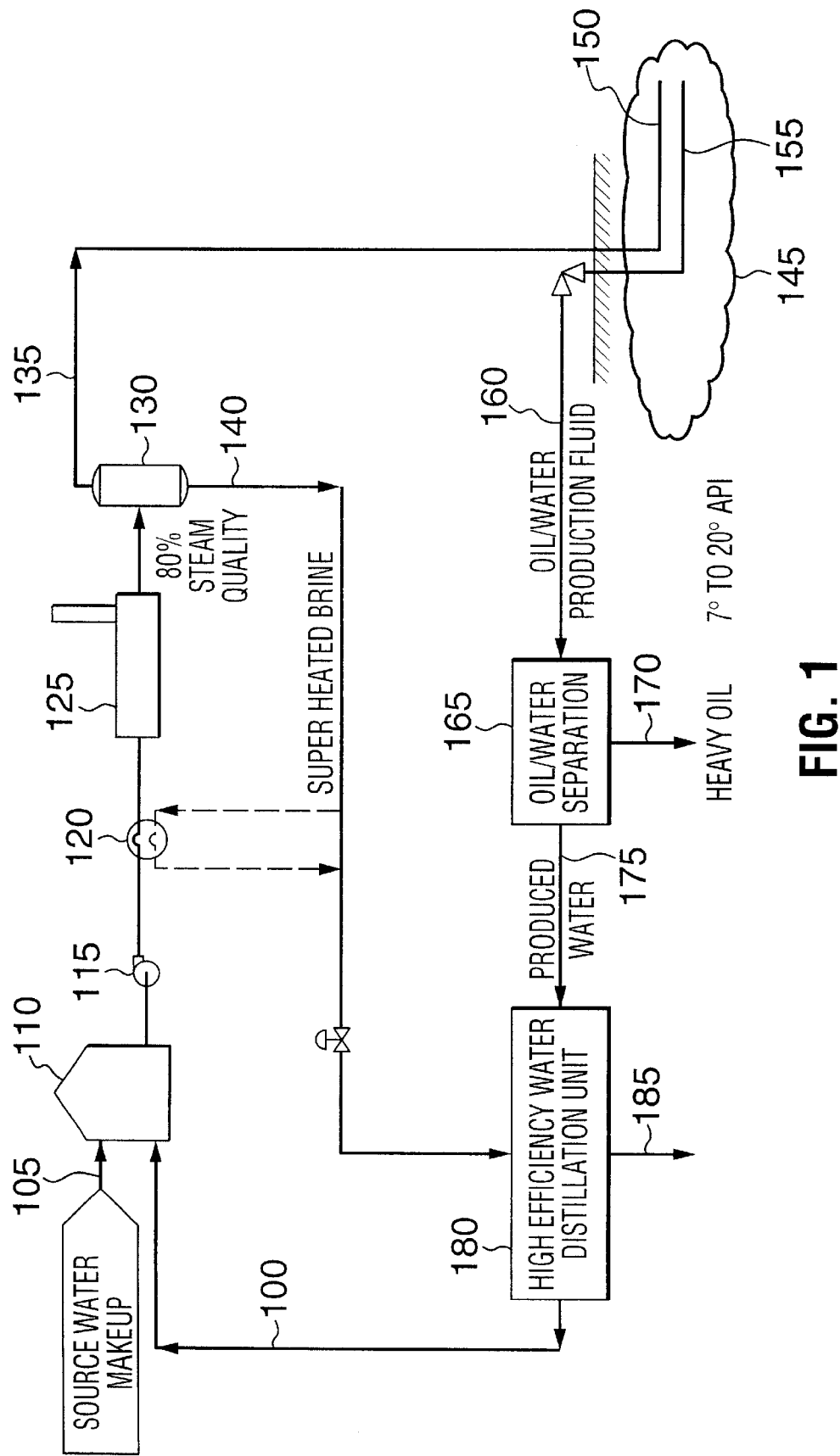
FIG. 1 is a schematic illustration of the overall process according to one embodiment of the described invention.

Referring now to FIG. 1, shown is an example of one embodiment of the present invention. Steam generator 125 feed water is collected in a feed water tank denoted as 110. The water is sourced from a suitable ground water source 105, recycled from or is makeup water from conventional treatment methods at 100, such as lime and caustic softening, ion exchange softening or distillation. Primarily, the feed water must have the hardness components, such as calcium, magnesium and silica, removed to prevent scaling of the high pressure steam generators 125. As an additional consideration, the dissolved solids must be less than 8,000 ppm (w) to produce the desired 80% quality high pressure steam. The total dissolved solids (TDS) primarily consists of sodium chloride. The volumes of water can range from as low as 10,000 barrels per day (BPD) for piloting heavy oil thermal facilities, to rates exceeding 100,000 BPD for commercial heavy oil thermal facilities.

The conditioned water from 110 is pumped by a series of feed pumps 115 to the high pressure steam generator 125. The typical steam generator 125, generates a 60 to 80% steam quality at pressures ranging from 1,000 psig to 3,000 psig or greater depending on the nature of the oil reservoir. This type of oilfield steam generator, familiar to those skilled in the art, is limited to less than 100% steam quality due to the inherent design and restriction related to tube scaling. Other boilers, conventional steam boilers and cogeneration heat recovery boilers can be used to generate saturated steam or 100% quality steam or superheated steam if high quality water, such as distilled water could be commercially made available.

Certain heavy oil reservoirs, for example, the heavy oil reservoirs using the SAGD technique, cannot transfer less than 100% quality steam to the reservoir without affecting oil recovery performance. For these operations, a high pressure steam separator, denoted as 130, is provided to separate the saturated steam 135 from the HP liquid phase 140, also referred to as the superheated brine. Some facilities use a portion of the energy available in 140 by exchanging at 120 with the steam generator feed water 115 before releasing the pressure. The amount of heat energy recovered varies on the level of steam pressure at 135, but generally is limited to a small portion. Therefore, most SAGD heavy oil facilities have a significant quantity of waste heat energy available in stream 140, which has limited use and is typically rejected to a cooling tower or in a cooler as waste heat. This waste energy stream can be delivered to a high efficiency water distillation unit 180 for treatment of the produced water 175 and have significant impact on lowering the commercial cost of water treatment and improving the production cost of heavy oil. The most significant impact, however, is the environmental benefits in that the makeup water and contaminated water for disposal can be eliminated and a significant portion of the waste energy can be recovered, resulting in a reduction of consumed fuel gas and overall air emissions.

High pressure steam 135 is injected into the reservoir 145 through well bore 150. Depending on the type of heavy oil recovery technique used, the well configuration will vary. FIG. 1 illustrates a typical SAGD arrangement where the steam is injected in a horizontal well bore and the heavy oil production fluid is recovered in an adjacent horizontal well bore 155. The production fluids are received at the surface and transferred by production lines 160 to the oil recovery facility 165. Heavy oil, typically less than 20° API and greater than 7° API is removed and commercially sold for petroleum refining.

The produced water 175, received at a typically water to oil ratio of 2 to 5, is transferred to the water treatment unit generally denoted as 180. The produced water will contain sodium chloride, silica, dissolved organic hydrocarbons, calcium and magnesium, primarily originating from the oil reservoir and initial makeup water source.

The concentrated brine wastewater or solids can be extracted from the water treatment unit 180 as stream 185. This stream typically has no commercial value and requires disposal on site or offsite, depending on the heavy oil facility location.

Generally, the high efficiency distillation water treatment unit noted as 180 will recover greater than 80% to 100% of the produced water in the form of pure distilled water at stream 100.

Figure 2:
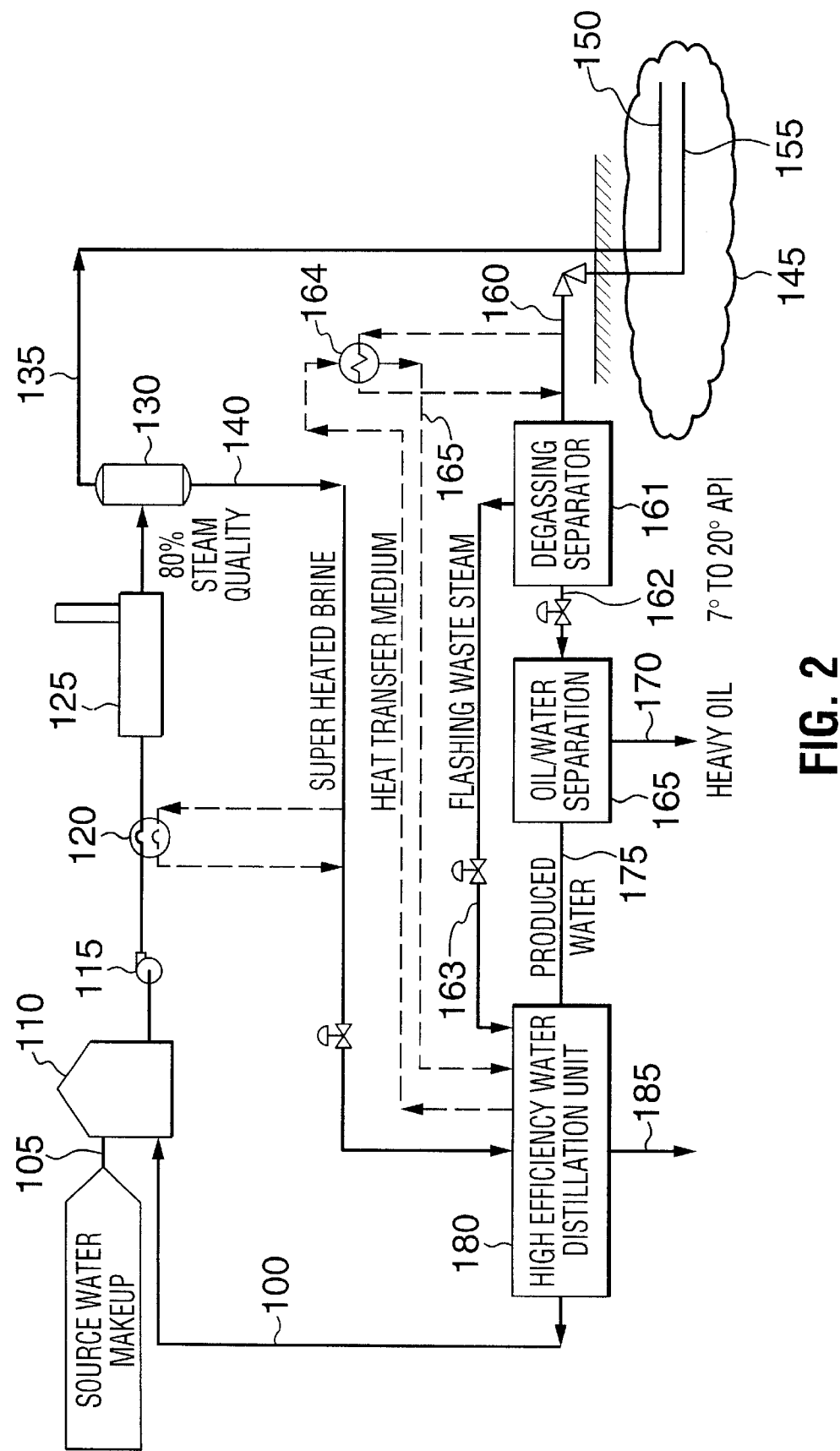
FIG. 2 is a schematic illustration of the overall process according to a further embodiment of the described invention.

Referring now to FIG. 2, shown is an example of a further embodiment of the present invention. This example represents a heavy oil recovery facility where the thermal conditions of the production fluids after the producing well bore 155 and well head 160 are required to be greater than the conventional 230° F., approaching 400° F. to 500° F., in order to enhance the performance of the heavy oil recovery. The hot production fluids pass through the degassing separator 161 as the pressure is reduced at 162 to feed the oil/water separation unit. Steam 163 is created at typical pressures of 40 to 60 psig (generally less than 100 psig) from the degassing separator 161. This low grade steam 163 is transferred to the high efficiency water distillation unit, commonly denoted as 180, for use in evaporating distilled water from the produced water. This technique of heat recovery can be used if the quantity of associated and/or injected lift gas is low relative to the steam produced in the production fluids 160.

If there is fairly high associated gas content in the heavy oil, not typically encountered, and/or lift gas is artificially injected in the production well bore 155, then an alternate heat energy recovery technique is required. The hot production fluids will transfer through any suitable heat exchange means to drop the temperature before entering the degassing separator 161. The waste heat energy is extracted from 164 using a suitable heat transfer medium and transferred by 165 to the high efficiency water distillation unit 180 to produce water to distilled water.

As shown in FIG. 2, both heat recovery methods using streams 140 and 165 can be used independently or combined depending on the operating conditions of the heavy oil reservoir 145 and the benefits gained by each method.

Figure 3:
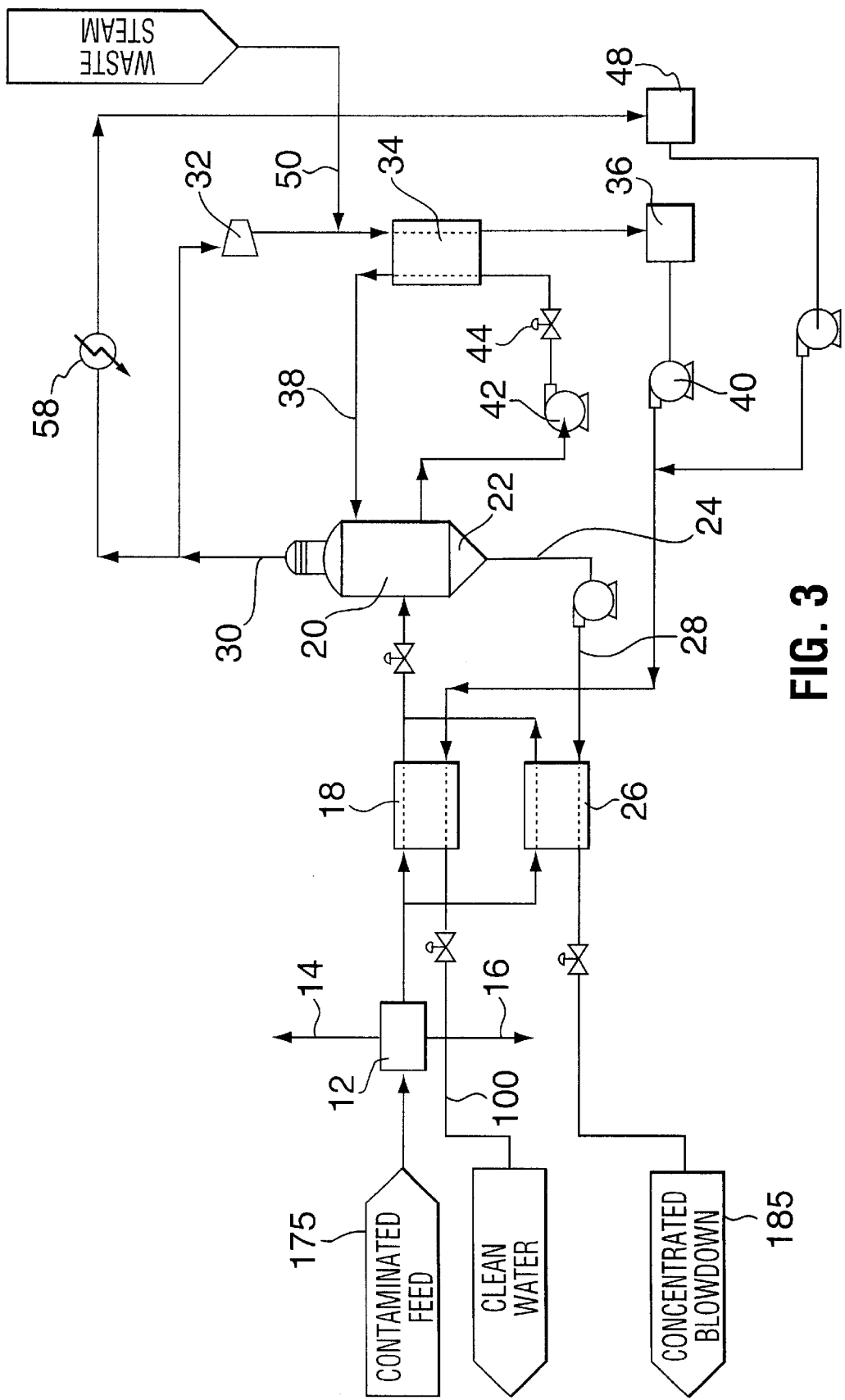
FIG. 3 is a schematic illustration of the water treatment unit contained within the embodiment of the described invention.

Referring now to FIG. 3, shown is an example of one embodiment of the high efficiency distillation unit generally denoted as 180.

The produced water feed stream, generally denoted by numeral 175, is introduced into a pretreatment step, generally denoted by 12, for removing insolubles, volatiles and/or performing other pH or conditioning steps for preparing the feed stream 175. Volatile components are vented from the feed stream at 14, while less volatile components are discharged from the feed stream at 16. The pretreated feed stream exiting 12 is then passed into a preheater 18 to elevate the temperature of the feed stream to enhance sensible heat recovery prior to introduction into a heated separator 20. The feed stream may be split into multiple streams and passed through other secondary sensible heat secondary recovery preheaters to maximize the full recovery potential of the unit. Such arrangements will be appreciated by those skilled in the art. The multiple preheaters may be configured as a single multi-service preheater or separate units as denoted by 18 and 26. The separate feed streams are recombined and heated to near heated separator conditions prior to entering the heated separator 20. If desired, the feed stream can also be introduced into the forced circulation stream to create a local dilution effect in the reboiler. The heated separator may comprise a multiple separation unit, such as a cyclonic separator. The lower section, broadly denoted by numeral 22, has cyclonic action to suspend solid material in the concentrate and discharge what is referred to as "blowdown" or concentrate as denoted by line 24. The rate of blowdown 24, continuous or batch, controls the concentration of components in the heated separator 20, thereby regulating the degree of saturation of the concentrate, the degree of supersaturation, subsequent precipitation of solids and the boiling temperature in the heated separator 20. The blowdown 24, at heated separator 20 temperature and concentration is passed through the secondary preheater 26 for heat recovery to the feed stream via line 28. The blowdown stream 24 is reduced to a temperature within about 3° F. to approach to the feed stream from 12 and released as stream 185.

The upper section of heated separator 20, containing mostly saturated steam vapor, is dedicated to vapor/liquid separation and may contain such features as a mesh pad or vane pack (not shown) to coalesce liquid droplets from the vapor stream. Vapor exiting the heated separator 20 and generally indicated by line 30, constitutes environmental quality distillate and depending on the components present in the feed stream, may comprise potable water or boiler quality feed water. A portion of the vapor is transferred into the compressor 32 to elevate the pressure and temperature of the vapor stream above that of the heated separator 20. The vapor stream can be at any pressure leaving the heated separator, including vacuum. This vapor is primarily saturated at the heated separator 20 conditions, however, it can become supersaturated if the concentrate contains components at a sufficient concentration to increase the boiling point of the vapor. This concept is known as boiling point rise or BPR and shall be understood so that the compression can be appropriately compensated. The additional energy imparted to the vapor stream sets up the required LMTD or thermal drive necessary to effect heat transfer in the reboiler heat exchanger, generally denoted by numeral 34. Any remaining portion of vapor, denoted as 46, is transferred to any suitable external condensing device 58 to recover vapor as distilled water in 48.

The compressor or blower, denoted by numeral 32, may be any device known to those skilled in the art, which can induce about 3 to 15 psi head into the vapor and flow the desired level of vapor mass. The actual head required from the compressor 32 is specifically determined for each unit by the evaporating conditions in the heated separator 20 and the required LMTD for the reboiler 34. The vapor leaving the compressor 32 is primarily superheated steam. The degree of superheat is dependant on the discharge pressure and efficiency of the compressor device 32. Waste energy in the form of low pressure saturated steam, typically less than 100 psig, more specifically less than 50 psig, can be added to the compressed vapor before entering the reboiler exchanger 34. The combined stream will reduce the level of superheat imported by the compressor.

The reboiler exchanger 34 functions to condense the combined vapor received from compressor 32 and waste energy source 50, to distillate draining from the reboiler 34 to a condensate receiver, denoted by numeral 36. This step captures the superheat and latent heat of the combined vapor stream and transfers it by means of thermal drive into the concentrate circulating stream denoted by numeral 38. The distillate accumulated in the receiver 36 generally is saturated liquid at a specific temperature and pressure condition. The additional sensible heat contained in the distillate is recovered by passing hot distillate using pump 40 back through the preheater 18, where the exiting stream is cooled to about 3° F. within the incoming feed stream from 12. The distilled water from receiver 36 and 48 can be combined to recover sensible heat prior to entering preheater 18 and is released as stream 100.

It has been found that by using a concentrate circulation pump 42 to circulate a prescribed quantity of concentrate from the heated separator 20, through the reboiler exchanger 34, significant results can be realized without over concentrating the concentrate and without the risk of fouling or scaling of the exchanger surfaces. The ratio of circulating concentrate mass to vapor is specifically selected to be in a range of less than 300 to at near 2, thereby precisely generating a vapor fraction of near 1% to less than 50% in the stream 38 exiting the reboiler exchanger 34. This mass flow can be varied and set at the desired parameter by using a control device generally denoted by numeral 44. More specifically, the desired target for vapor fraction in the exiting circulating stream 38, when considering most contaminated feed streams, is less than 10% vapor fraction. The vapor generated in the stream 38 is equivalent in mass to the amount recovered as distillate at 100. The vapor created in the reboiler exchanger 34, even though it is very small in mass fraction (about 1 to 10% of the circulating mass), absorbs the majority of heat transferred from the condensing side of the reboiler 34. The selection of vapor fraction and concentrate circulation rate is an important factor in reducing fouling and scaling, and preventing over concentrating of the fluid in the exchanger. To a greater extent, this parameter is most important to establish a very low temperature rise on the concentrate circulating fluid to maintain an effective LMTD without a temperature cross in the reboiler exchanger 34. Any temperature rise will quickly eliminate the LMTD and heat transfer will stop. For example, if the pressure of the circulating concentrate were increased in the reboiler such that the fluid could not create some vapor, the temperature would rise by sensible heat absorption until no LMTD or thermal drive would exist and thus the heat transfer would decline. The back-pressure of the concentrate circulating system, consisting of static and friction head losses, is designed to be minimal. In fact, the back pressure is primarily equal to the static head loss of the vertical exchanger, as the dynamic pressure drop of the exchanger is minimized. The circulating concentrate flow is then selected to achieve near 1% to 10% vapor fraction in the outlet line 38. The resulting temperature rise is very low and the LMTD remains at its design value.

FIG. 3 illustrates an example whereby saturated waste steam is combined with compressed steam to absorb the waste heat energy in a single reboiler 34. The combined steam is condensed to form a condensed distillate. If the available waste steam pressure is not compatible or could not be made to be compatible, then separate concentrate circulation loops and reboiler exchangers are provided, specifically designed to suit each heat source. Furthermore, if waste heat was only available by means of a non-condensing heat transfer fluid, then the waste heat exchange is designed to extract the heat from the transfer fluid without a condensed distillate. The key design features of the reboiler will always be to maintain the preferred mass liquid to vapor mass ratio to create a vapor mass of 1% to 10% in the evaporating fluid.

Figure 4:
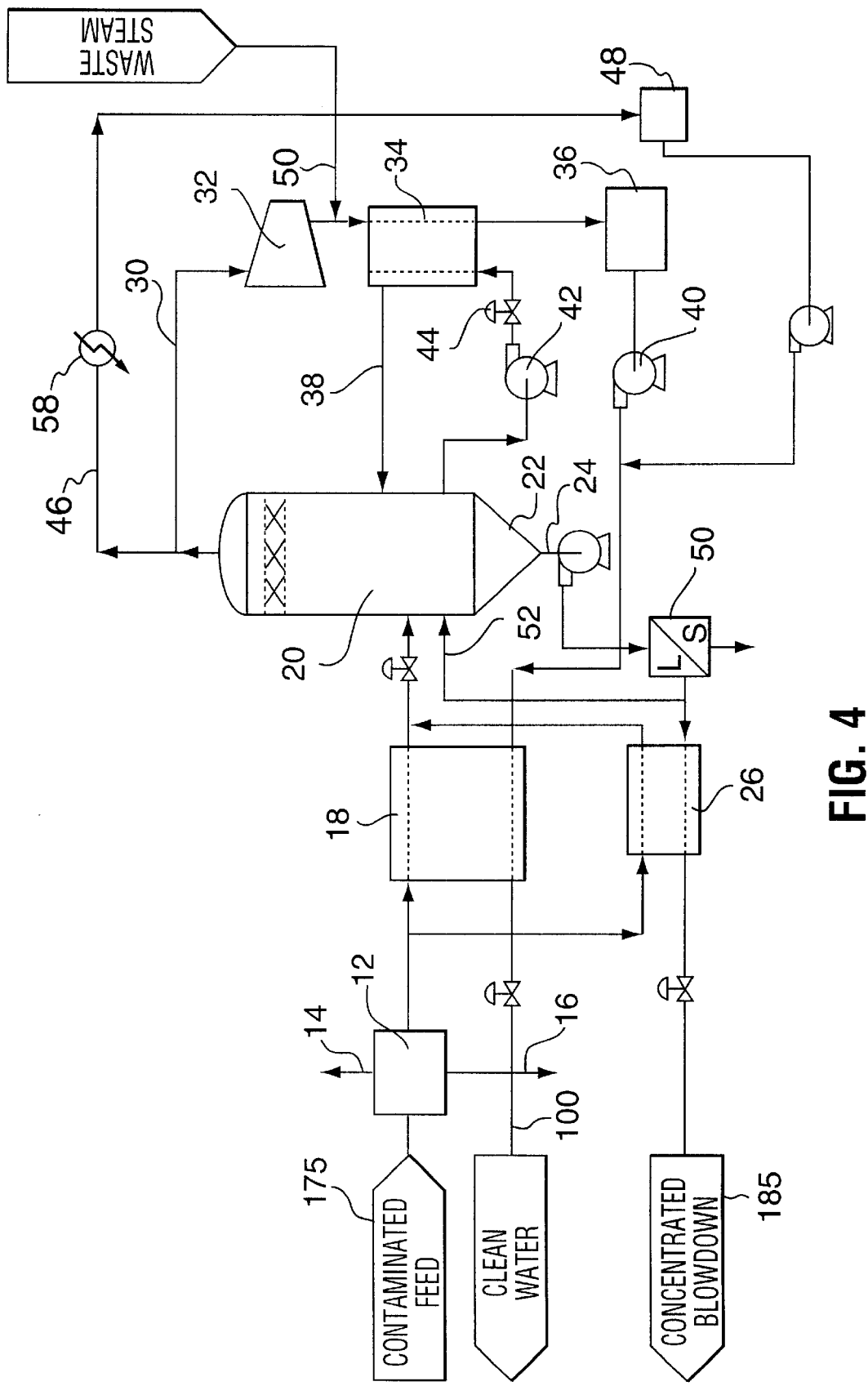
FIG. 4 is an alternate embodiment of FIG. 3.

Referring now to FIG. 4, shown is an alternate process scheme which allows for blowdown 24 from the heated separator 20 to be adjusted until the overall concentration effect or concentration factor (CF) of the system creates a supersaturated concentrate with respect to one or many components to cause precipitation. As the solids form and build in the heated separator 20, the blowdown 24 is passed through a solid/liquid separation device, generally denoted by numeral 50, for removal of the solids or sludge. As an alternative, the solid/liquid separation device 50 can be located between the reboiler pump 42 and the exchanger 34, in a slipstream or total flow arrangement. The recovered liquid is further recycled back to the heated separator 20 as indicated by 52 and a portion representing the blowdown quantity, is further passed through the preheater 26 for heat recovery and cooled to about 3° F. of stream 175. The solid/liquid separation device 50 can be of any form such as filter, hydro cyclone, centrifugal settler, gravity settler, centrifuge, decanting separator, known to those skilled in the art. This process is particularly attractive when the major objective is to recover a compound as a solid or when the compound is of significant commercial value.

Figure 5:
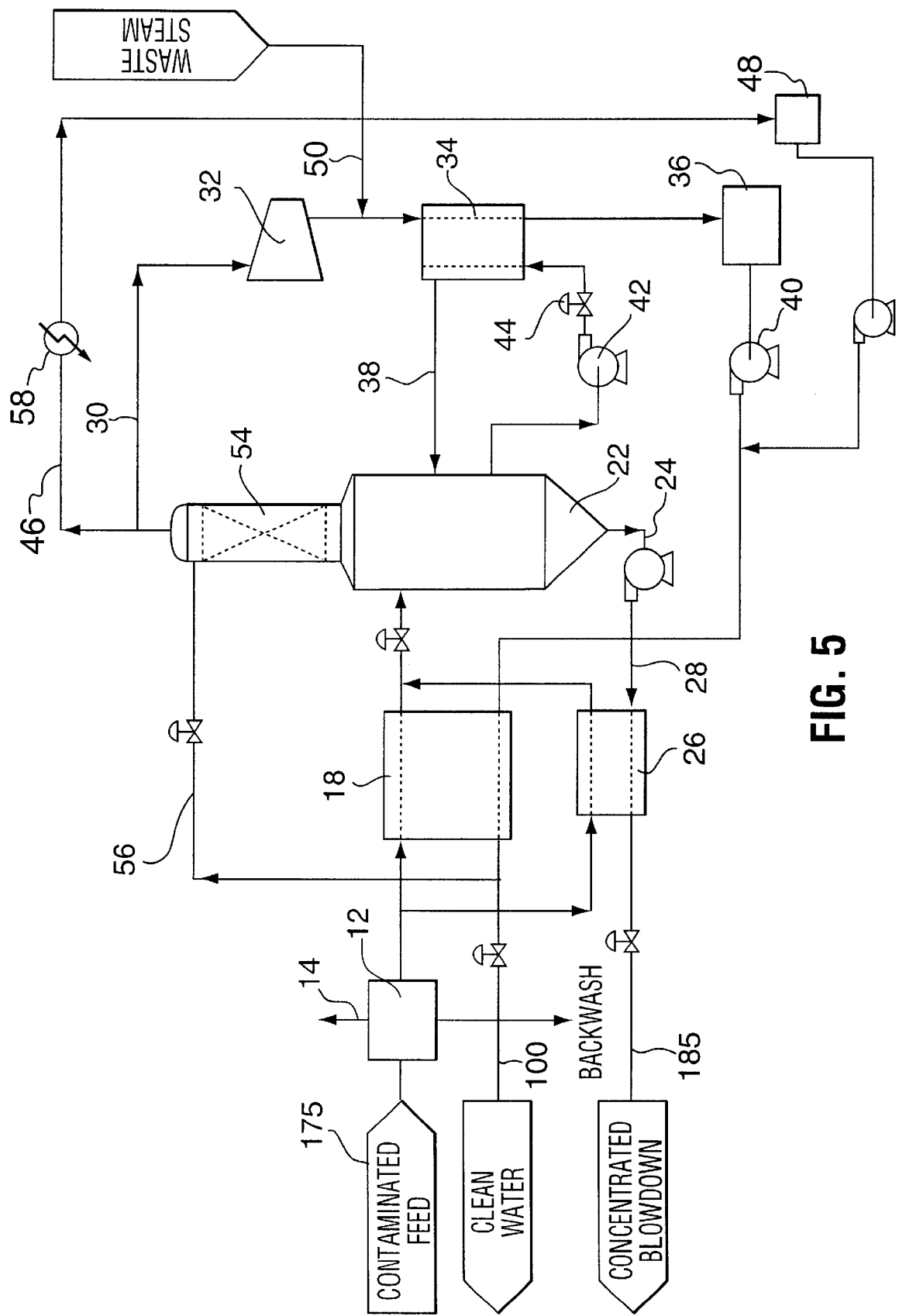
FIG. 5 is a further alternate embodiment of FIG. 3.

Referring further to FIG. 5, shown is a further process variation by which the vapor stream may contain a portion of a particular contaminant from the feed stream. The heated separator 20 is equipped with a fractionation column 54 ahead of the compressor 32 and excess steam line 46. The column 54 is used to fractionate and scrub out the contaminate using multiple stages in conjunction with clean cool water reflux, denoted by numeral 56. The reflux can be drawn from either upstream or downstream of the preheater 18 or a combination, depending on the required reflux temperature. This process variation is attractive when the feed stream contains, for example, volatiles such as hydrocarbons, glycols, ammonia, amines, etc.

Figure 6:
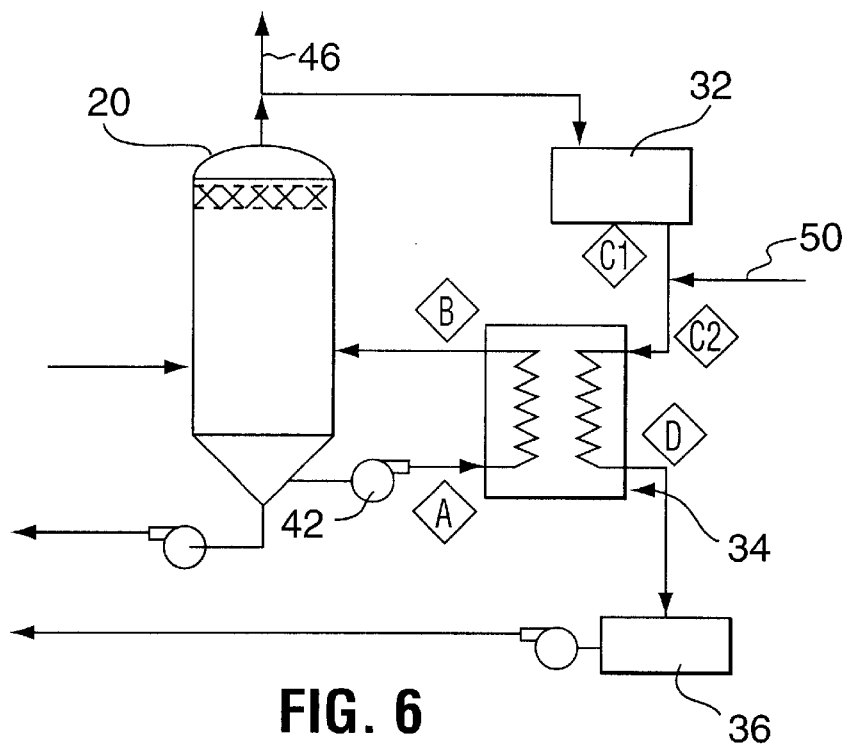
FIG. 6 illustrates, in a schematic form, the typical pressure and temperature conditions around the evaporation components.
Figure 7:
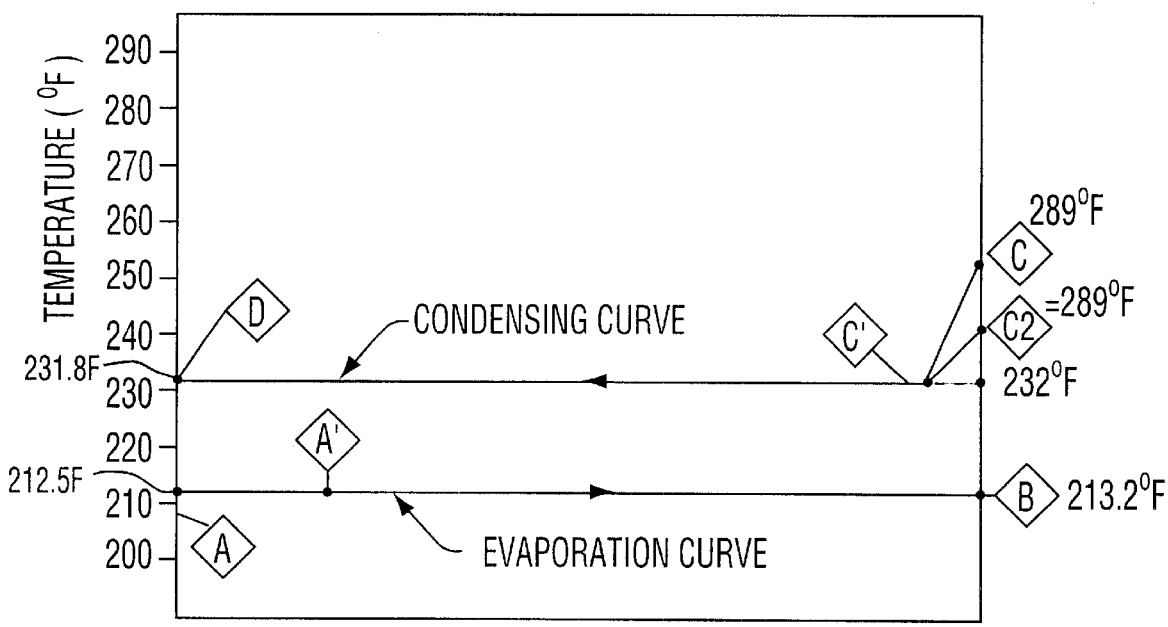
FIG. 7 is a process condensing/evaporating curve for the system reboiler exchanger.

FIG. 6 illustrates the typical pressure and temperature relationships of the various streams around the evaporation portion of the process. Numerical references are made from FIGS. 2 through 4 for this discussion. Although the specific process parameters are shown by way of example, they are modifiable to suit any specific distillation application. This schematically shows the conditions based on a fluid with no boiling point rise and the heated separator 20 operating at slightly above atmospheric pressure, 16 psia and 212.5 ° F. The circulating concentrate temperature rise is about 1° F. for a reboiler pressure drop of 2.5 psi. The vapor fraction of the circulating stream is about 10%. The conditions around the reboiler exchanger 34 can be represented on a evaporation/condensing curve as shown in FIG. 7. On the condensing side of the exchanger, superheated steam from the compressor at point C1 at about 289° F. and 21.0 psia combines with the saturated waste heat stream source at C2 and is condensed at the saturated pressure of the vapor at point C', about 232° F. and 21.0 psia. This zone is commonly referred to as the desuperheating zone and consists of about 2% of the exchanger surface area, the remaining zone being the area by which the latent heat of condensation is released. The area required for desuperheating is reduced as the ratio of saturated waste heat to compressed steam increases. A slight drop in pressure and temperature will occur through the exchanger 34 due to the inherent pressure drop of the heat exchanger. The outlet conditions become about 231.8° F. and 20.9 psia. The surface temperature, on the condensing side, will be less than the saturation temperature of the incoming vapor, thereby forming a condensate film on the heat exchange surface. The heat transfer will therefore occur off the wet wall condition maintaining the effective temperature of the film at the vapor saturation temperature. The distillate will drain from the exchanger to the condenser receiver 36 at point D, keeping the reboiler free of liquid and exposing all of the heat exchanger surface to the condensing process.

On the evaporating side, concentrate enters the exchanger counter currently from the bottom at point A at about 212.5° F. and 18.0 psia after the circulating pump 42. The circulation rate is adjusted so that the ratio of concentrate mass is at least 10 times greater than the vapor rate. The temperature of the concentrate fluid begins to rise to point A', and then levels off to about 213.2° F. as point B is reached, where the static head is overcome and the pressure reduces to 15.5 psia. While the concentrate rises up the exchanger 34, vapor begins to form by forced convection, absorbing the latent heat transferred. By increasing the fluid mass on the evaporating side until the ratio of circulating mass to vapor mass falls within the desired range, the boiling effect is controlled within the forced convection and stable nucleate boiling regions. Because of the high mass flow of liquid, the heat transfer surface remains wetted at a temperature equivalent to the saturated temperature of the newly formed vapor. By further ensuring that the flux rate $(QA^{-1})$ for a exchanger is below 6000 BTU $hr^{-1}$ $ft^{-2}$, the temperature rise for the evaporating side can be maintained below 1° F. and the wetted film surface is maintained, thereby eliminating the risk of scaling. If the flux rate is too high, the instantaneous vapor acceleration pressure drop temporarily exceeds the available static head, resulting in unstable temporary backflow and possible breakdown of the wetted heat transfer surface. This may result in fouling of the heat transfer surface. Below heat fluxes of 6000 BTU $hr^{-1}$ $ft^{-2}$ and within the range of circulating concentrate mass to vapor mass less than 300, there exists a region where the liquid and vapor can co-exist in stable operation and maintain a fully wetted heat transfer surface on the evaporating side of the reboiler, without the risk of fouling or scaling.

Figure 8:
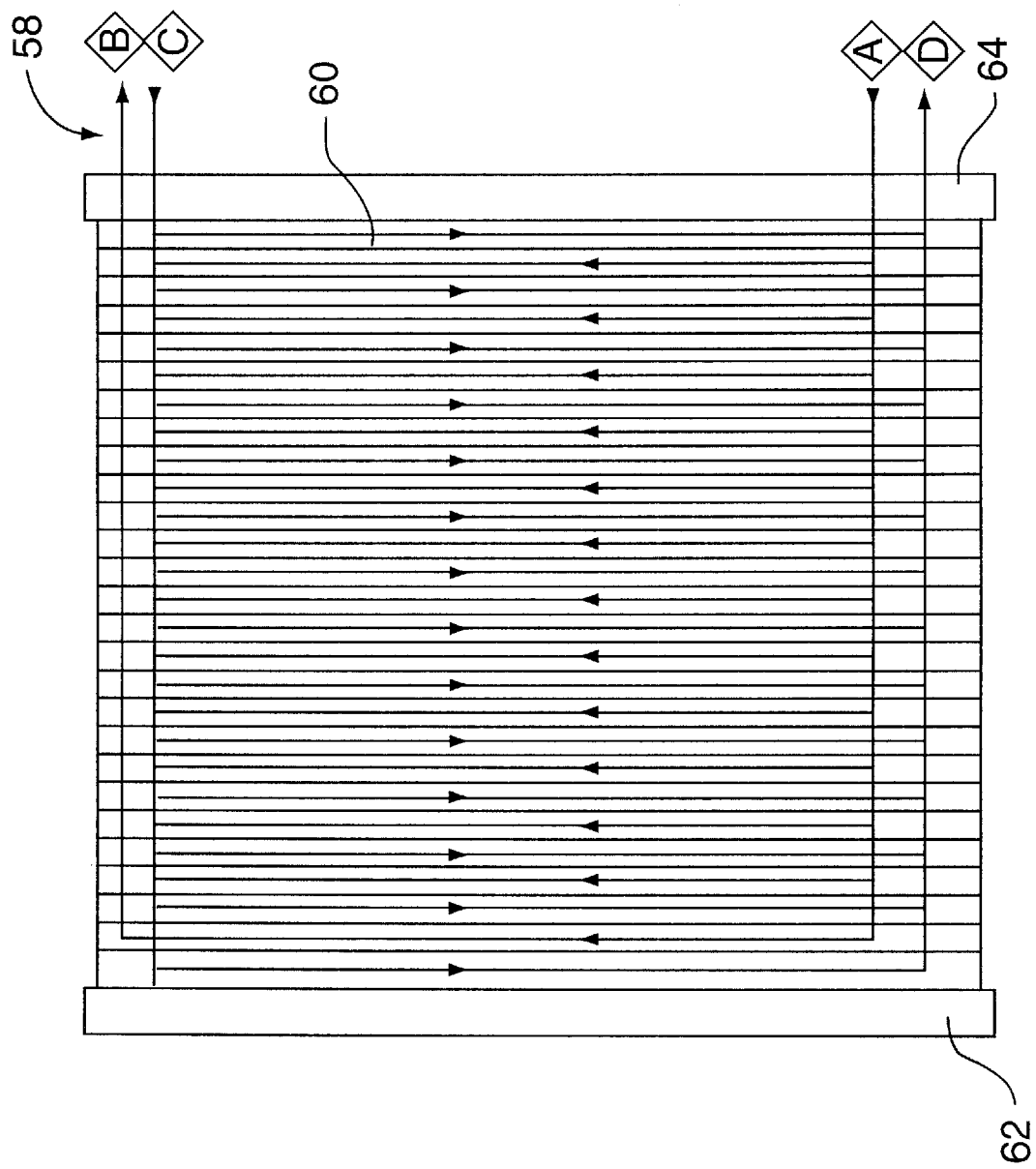
FIG. 8 illustrates the schematic of the flow pattern for the reboiler plate/plate heat exchanger.

Reference to points A through D is also found on FIG. 8.

FIG. 8 illustrates the elevation view of a highly efficient heat transfer exchanger 34, known by those skilled in the art as a plate and frame heat exchanger, whereby rows of vertically stacked, gasketed plates 60 are arranged between two solid frames 62 and 64. These devices are well known for their compact size and ability to have very high U values or overall heat transfer coefficients. This type of exchanger, arranged as a single pass, countercurrent flow configuration is well suited for the present invention and specifically offers the following benefits to perform the present invention:

1. The plate type exchanger offers a low, fixed static head and very low pressure drop on the concentrate circulating fluid or evaporating side, while providing a relatively high heat transfer coefficient;

2. The heat flux can be easily adjusted by adding more surface area or plates in a given frame;

3. The condensing side of a plate frame design is free draining and has low pressure drop, while maintaining a relatively high heat transfer coefficient;

4. The highly effective heat transfer coefficient allows the surface temperatures to be very near to both fluid stream temperatures reducing the risk of fouling;

5. The high turbulence and equivalent high fluid velocities results in low fouling and maintains the solids in homogeneous suspension as they pass through the exchanger;

6. There are no hot or cold spots and no dead flow regions inherent to a plate frame design lowering the risk of fouling or scaling;

7. Plates are smooth and well finished reducing the risk of fouling; and

8. Low fluid residence time reduces the risk of precipitation, as there is insufficient time to reach equilibrium and generate scaling contaminants.

More generically, the plate type heat exchanger is very compact and can be provided cost effectively with exotic alloy plates to resist fluid corrosion and stress corrosion cracking, common to desalination type applications. Other types of exchangers, shell and tube, double pipe, finned tube, spiral type, may also be considered by those skilled in the art, provided the specific requirements of the invention are maintained.

Figure 9:
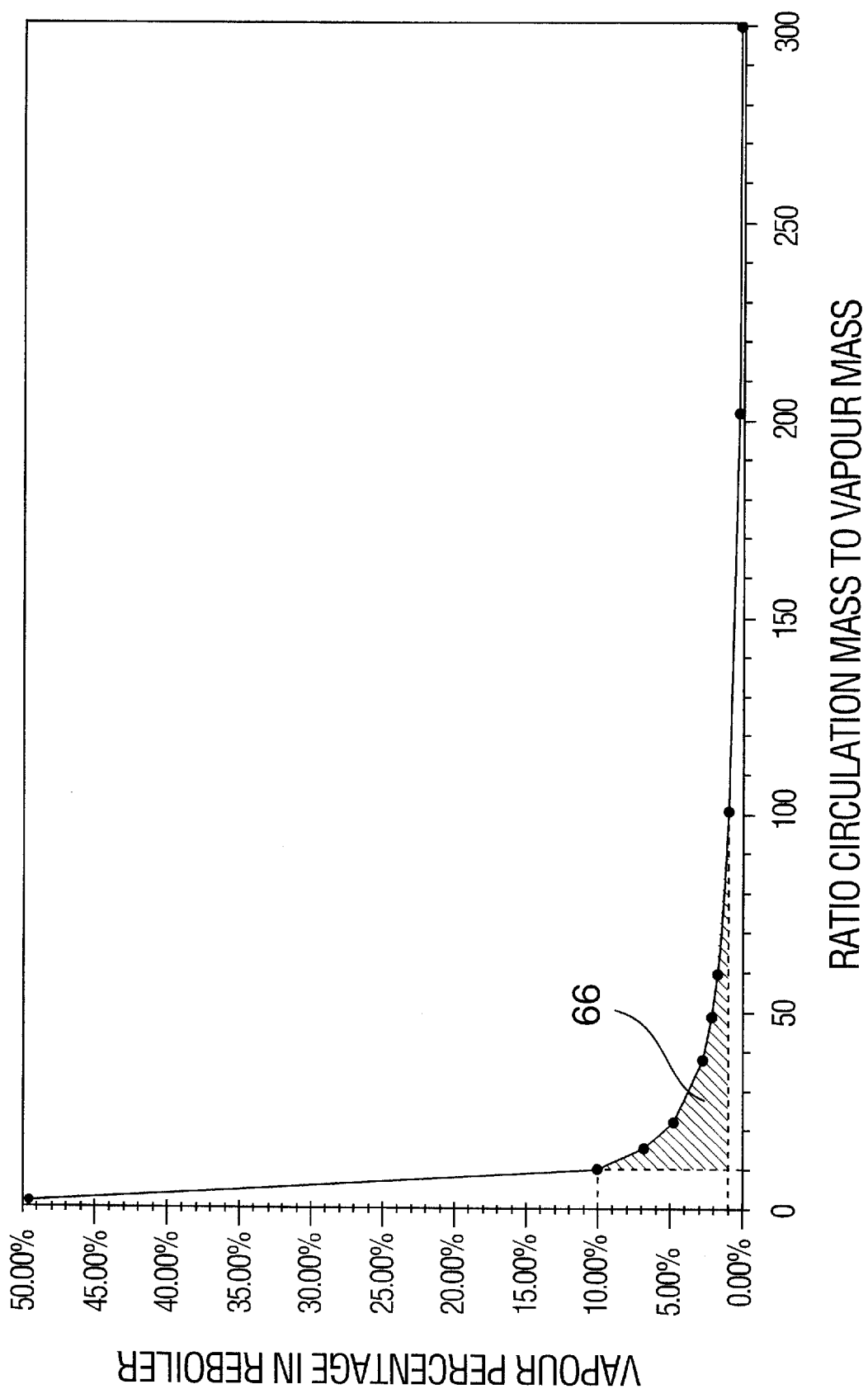
FIG. 9 is a chart illustrating the level of vaporization in the reboiler, occurring in the circulating fluid with relation to the ratio of circulating fluid mass to vapor mass.

FIG. 9 is a chart showing the preferred design range, globally denoted by 66, for the ratio of circulating concentrate mass flow in relation to the vapor mass flow. The desired range from about 10 to 100 results in a vapor fraction of less than 10% to near 1%.

Figure 10:
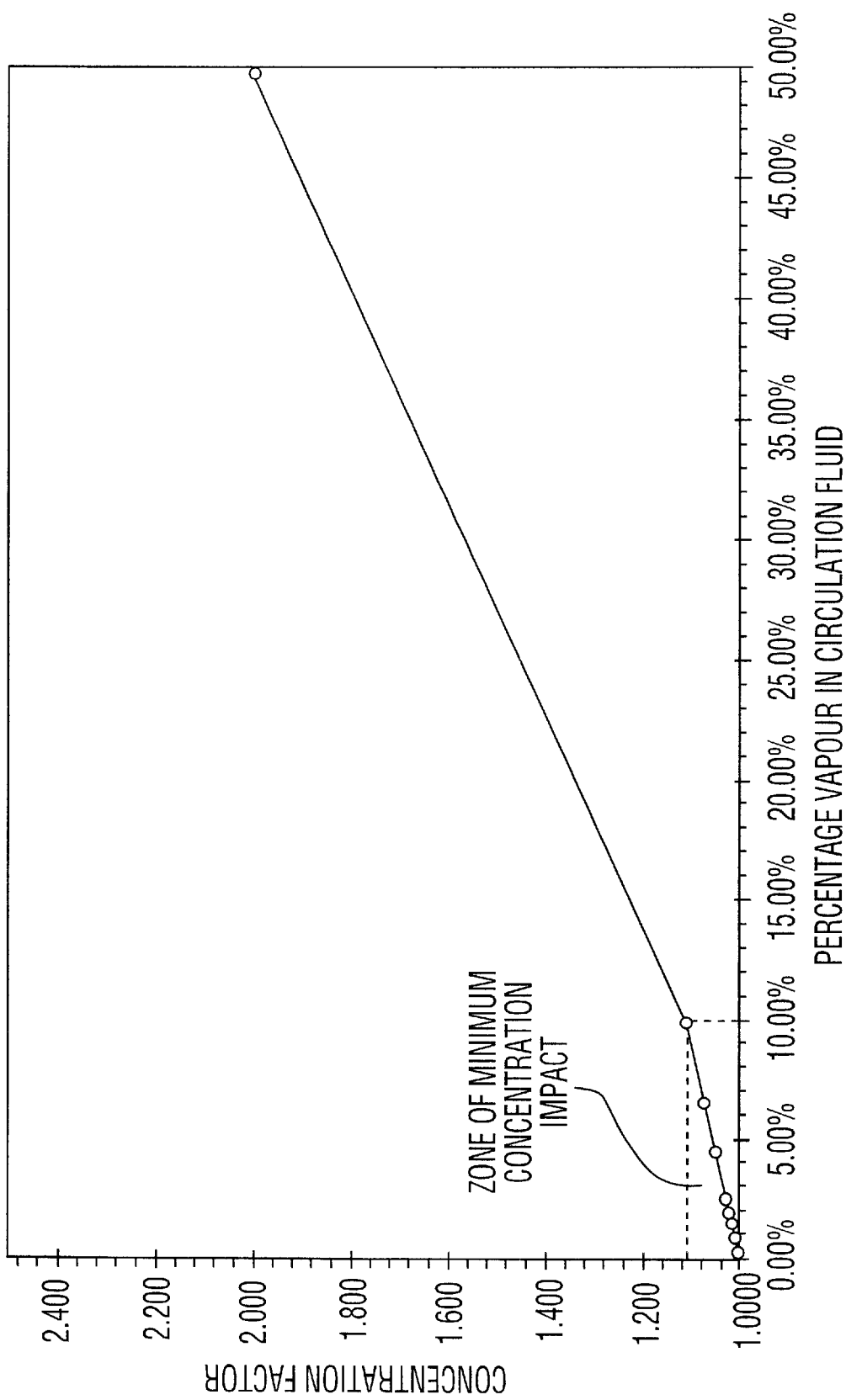
FIG. 10 is a chart illustrating the resulting localized concentration effect in the reboiler with varying vapor fractions.
Figure 11:
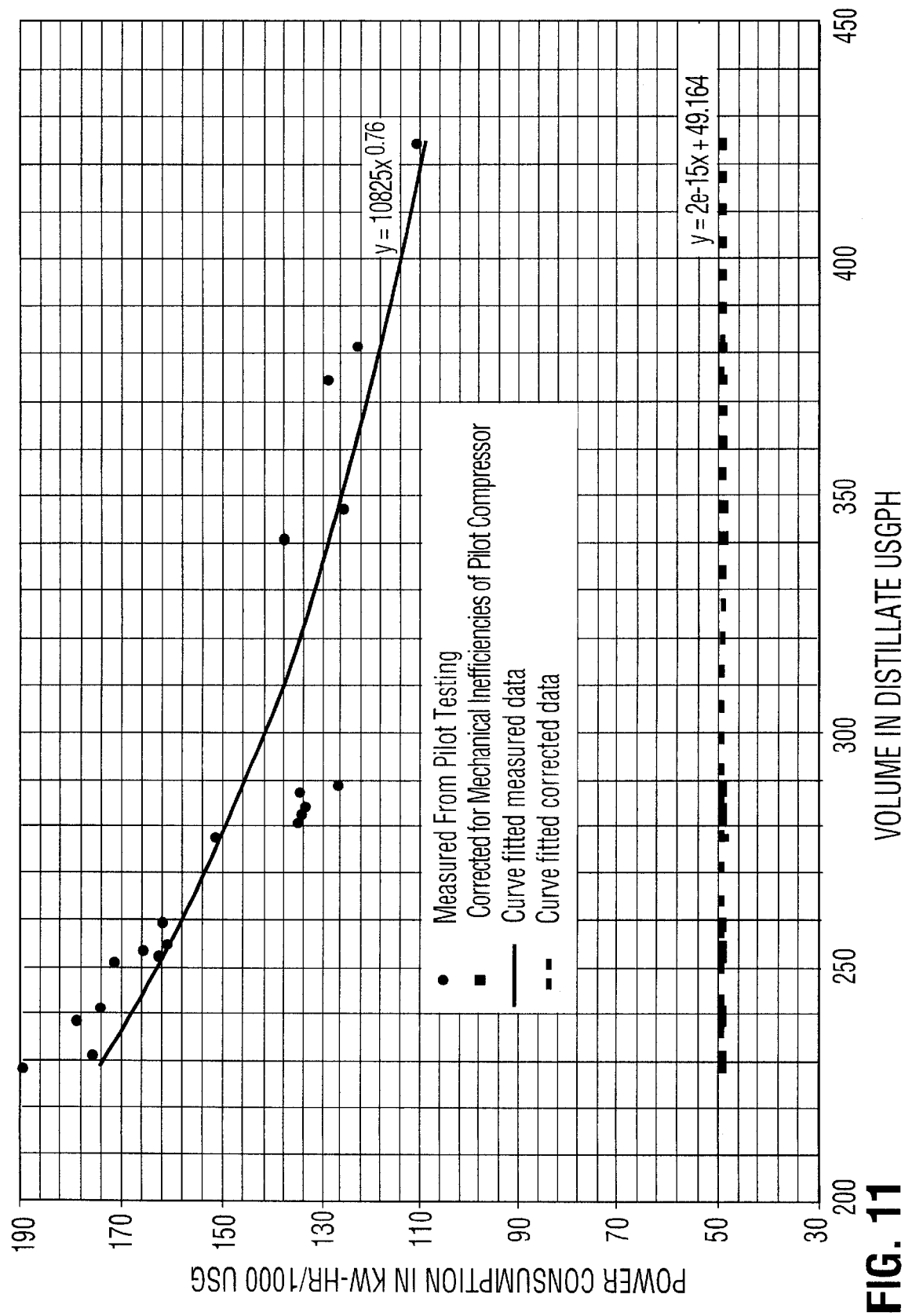
FIG. 11 is a chart showing the test data obtained from a distillation unit pilot.

FIG. 10 is a chart showing the resulting impact on the local concentration factor $CF_{EXCHANGER}$ in relation to the risk of further supersaturation and precipitation within the heat exchanger. Generally, the system concentration factor can be expressed as follows;

$$CF_{TOTAL} = CF_{BLOWDOWN} \cdot CF_{EXCHANGER}$$

The concentration which reaches steady state in the heated separator results from the steady removal of vapor in balance with a continuous blowdown from the heated separator. The value of the $CF_{TOTAL}$ is typically in the order of less than 5 to about 20 times, depending on the level and type of contaminates in the feed stream. Also depending on the level of vapor mass leaving the reboiler, the resulting $CF_{EXCHANGER}$ is determined (between 1.0 and 1.1) and the blowdown rate adjusted so that the desired concentration levels are not exceeded in the reboiler. A typical example can be shown as follows:

Feed stream contains 20,000 TDS, and it is desired not to exceed 100,000 TDS in the concentrate.

It is determined that the most effective mass ratio will be 20, resulting in a vapor fraction of 5%, from FIG. 7.

The $CF_{EXCHANGER}$ is located from FIG. 8 to be about 1.07. The $CF_{TOTAL}$ is calculated to be (100,000/20000)=5.

The $CF_{BLOWDOWN}$ is calculated to be (5/1.07)=4.7.

Therefore the corrected blowdown rate shall be (1/4.7)= 21% of the inlet feed stream.

Accordingly, by making use of a vapor recompression and waste heat recovery process in combination with a forced convection heat transfer system, and by following the steps of carefully selecting the ratio of mass flow of the circulating system to the vapor stream mass flow to be less than 300 to about 2, more specifically a ratio of about 10 to 100, selecting a heat flux of less than 6000 BTU $hr^{-1}$ $ft^{-2}$, and managing a blowdown stream to achieve the desired concentration effect (CF), the result is a very efficient water distillation unit which is not susceptible to fouling or scaling over long periods of operation. By combining the two known process schemes and incorporating the waste heat recovery scheme with a unique heat exchange configuration, and more particularly, designed with a specified concentrate circulation ratio not previously taught by prior art, allows the present invention to provide an effective method to distill water free of contaminants, without the risk of fouling and scaling.

The following examples serve to illustrate the invention.

EXAMPLE 1

This example calculation is a means of demonstrating the heat balance around the reboiler exchanger. This example represents a design basis of a distillation unit designed to recover 53,000 USGPD of clean distillate from a contaminated source.

| Exchanger Information | |
|---|---|
| Surface Area | 3,200 ft$^2$ |
| Type | Gasketed Plate-Frame |
| U | 542 BTU hr$^{-1}$ ft$^{-2}$ F$^{-1}$ |
| Corrected LMTD | 10.40 F |
| Calculated Service Duty | (3,200)*(542)*(10.40) |
| | 18,041,224 BTU hr$^{-1}$ |
| Calculated Heat Flux | (18,041,224)/(3200) |
| | 5638 BTU hr$^{-1}$ ft$^{-2}$ |
| Condensing Side | |
| Inlet Conditions | 289° F. @ 21.0 psia (superheated) |
| Outlet Conditions | 231.8° F. @ 20.9 psia |
| Saturated Condensing Temperature | 232.0° F. @ 21.0 psia |
| Latent Heat of Condensing | 957.4 BTU lb$^{-1}$ @ 21.0 psia |
| Steam Flow | 36.7 USgpm = 18,352 lb hr$^{-1}$ |
| $Q_{DESUPERHEAT}$ | (18,352)*(0.45)*(289−232) |
| | 471,131 BTU hr$^{-1}$ |
| $Q_{CONDENSE}$ | (18,041,224−471,131) |
| | 17,570,093 BTU hr$^{-1}$ |
| Calculated Flow | (17,570,093)/(957.4) |
| | 18,352 lb hr$^{-1}$ |
| Evaporating Side | |
| Inlet Conditions | 212.2° F. @ 18.0 psia |
| Outlet Conditions | 213.6° F. @ 15.5 psia |
| Latent Heat of Vaporization | 968.9 BTU hr$^{-1}$ @ 15.5 psia |
| Ratio of Circulated Mass to Vapor Mass | 10 |
| Concentrate Circulation Rate | 370 USgpm |
| | 184,926 lb hr$^{-1}$ |
| Vapor Flow | 18,352 lb hr$^{-1}$ |
| Percent Vapor | (18,352/184,926) = 10% |
| $Q_{EVAPORATE}$ | (18,352)*(968.9) |
| | 17,782,328 BTU hr$^{-1}$ |
| $Q_{SENSIBLE}$ | (184,926)*(1.0)*(213.6−212.2) |
| | 258,896 BTU hr$^{-1}$ |
| $Q_{TOTAL}$ | (17,782,328) + (258,896) |
| | 18,041,224 BTU hr$^{-1}$ |

This example illustrates that the 10% vapor fraction created in the circulating fluid will capture 99% of the heat transferred from the condensing side and increase the circulating fluid temperature about 1° F., even though there is 10 times the mass of circulating liquid.

EXAMPLE 2

A prototype unit was fabricated designed to recover 10,000 USgpd of clean distillate from a landfill leachate lagoon. The unit was tested over an extended period and detailed performance test data was collected during this period. The pilot operated successfully for an extended four month period and upon inspection fouling was negligible in the reboiler and heated separator. The equipment used at the pilot test included a Spencer™ Model GF36204E Blower Compressor providing a 3.0 psi differential pressure. Standard single pass, plate-frame heat exchangers were used during the test.

The leachate feed, concentrated blowdown, and treated effluent characteristics were as follows:

| Parameter | Units | Leachate Feed[2] | Blowdown approx 10%[2] | Treated Effluent[2] |
|---|---|---|---|---|
| BOD | mg l$^{-1}$ | 26 | 88 | <10 |
| COD | mg l$^{-1}$ | 277 | 1,207 | 11 |
| TOC | mg l$^{-1}$ | 59 | 549 | 6 |
| TSS | mg l$^{-1}$ | 33 | 145 | <2 |
| VSS | mg l$^{-1}$ | 15 | 29 | <2 |
| TDS | mg l$^{-1}$ | 5,473 | 53,000 | <50 |
| Calcium | mg l$^{-1}$ | 96 | 435 | <0.05 |
| Magnesium | mg l$^{-1}$ | 228 | 1,990 | <0.05 |
| Sodium | mg l$^{-1}$ | 550 | 4,650 | <2 |
| Iron | mg l$^{-1}$ | 5 | 469 | .6 |
| Total P | mg l$^{-1}$ | 1.5 | 1.5 | <0.01 |
| Ammonia as N | mg l$^{-1}$ | 53 | 124 | 0.38[1] |
| Total Alkalinity As CaCO$_3$ | mg l$^{-1}$ | 2,353 | 2,930 | 1 |
| Chlorides | mg l$^{-1}$ | 217 | 784 | 0.2 |
| Sulfates | mg l$^{-1}$ | 350 | 20,000 | <2 |
| Total Phenols | mg l$^{-1}$ | 0.08 | 0.45 | .017 |
| Total Coliform | Col/100 cc | 673 | <3 | 0 |
| Colour | TCU | 166 | 800 | <5 |
| Turbidity | NTU | 131 | 220 | 0.1 |

[1]pH pretreatment adjustment to control ammonia.
[2]Values are shown as average values over the test period.

Note (1)—pH pretreatment adjustment to control ammonia.
Note (2)—Values are shown as average values over the test period.

The effluent is of such quality that it can be discharged to the surface water bodies exceeding virtually all regulatory guidelines. The compressor power consumption was measured and recorded for various performance points, including compressor turndown and recycle conditions. The measured power consumption was plotted on FIG. 10 as power consumption per 1,000 USgal for the various distillate flows. The test data curve was corrected for the compressor inefficiencies over the range of flows and a uniform power consumption value of 50 KW-hr/1000 USgal was derived. Allowing for standard compressor efficiencies of about 77%, the required power consumption for the high efficiency distillation unit is about 65 KW-hr/1000 USgal. The blowdown stream averaged about 10% of the feed stream throughout the test period, resulting in an average concentration factor (CF) of 10. A visual inspection was completed after the testing, showing no signs of scaling in the heated separator and reboiler equipment.

Figure 12:
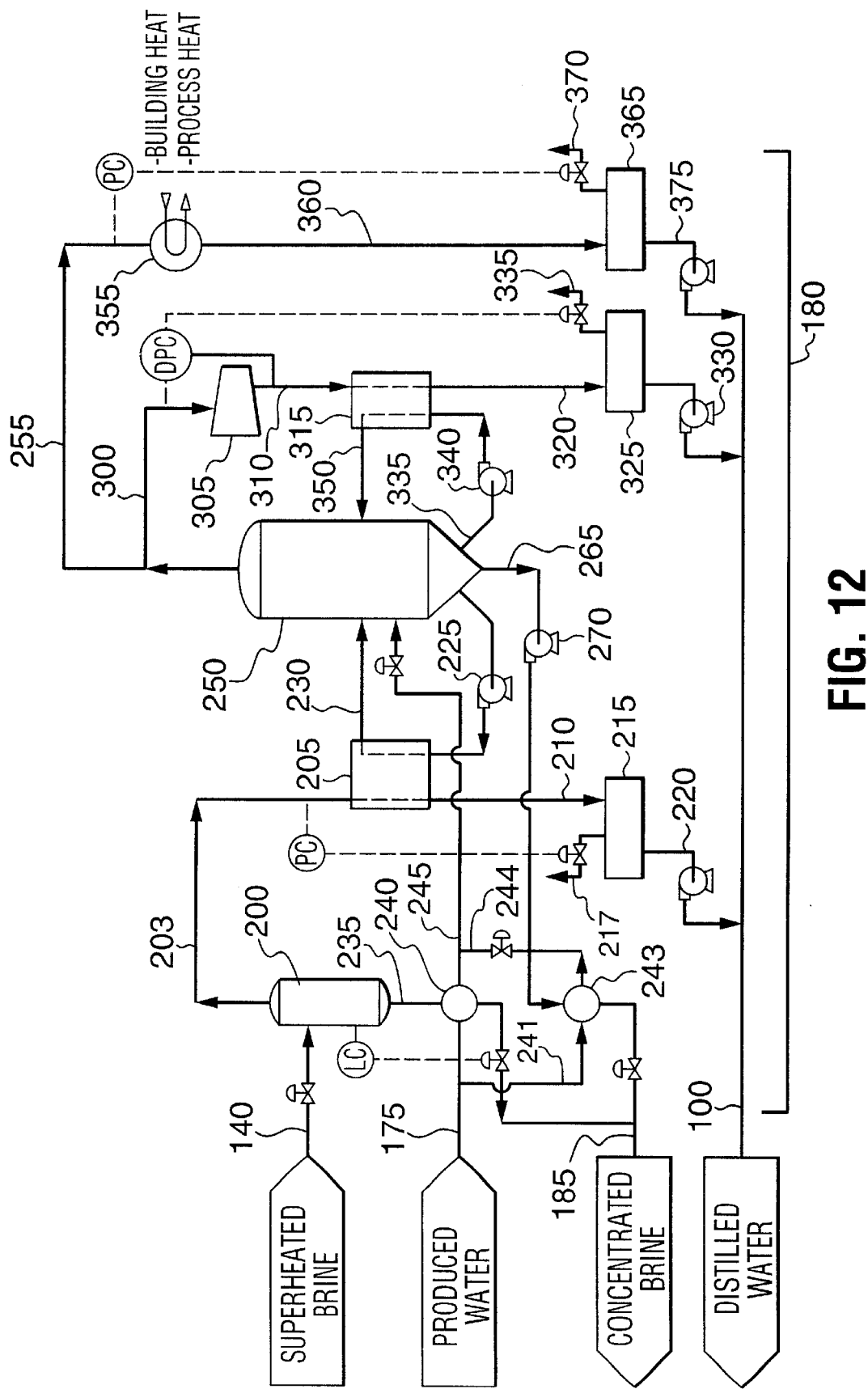
FIG. 12 is a schematic illustration of the overall process according to a further embodiment of the described invention.

Turning to FIG. 12, shown is a further variation of the present invention. In this embodiment, superheated brine blowdown 140 is received from the high pressure steam separator 130 in FIG. 1 and transferred to the high efficiency water distillation unit, generally denoted as 180.

The blowdown stream 140 is flashed into a low pressure separation 200 to create a low pressure (typically 10 to 50 psig) waste energy stream 203 and a low pressure concentrated blowdown stream 235. The waste energy stream 203, is passed through the reboiler exchanger 205, condensed to distilled water and collected in the surge tank 215.

The HP concentrated blowdown stream 235 is heat exchanged with 240 to preheat the produced water 175 to 245. The cooled concentrated blowdown is released for disposal as stream 185. The waste energy from stream 203 is transferred to the circulating concentrate from the heated separator where, by way of controlling the circulating mass to vapour stream to a range of less than 300 to near 2, less than 50% vapour or more precisely less than 10% vapour, is generated in the circulating concentrate stream exiting the reboiler at 230. The vapour formed in the circulating stream absorbs the latent heat of vaporization, while at the same time not allowing the temperature rise on the circulating concentrate to increase greater than about 1° F. and maintain an effective LMTD without a temperature cross in the reboilers exchanger 205.

The circulating concentrate is removed at a controlled rate at 265 by a pump 270 and exchanged at 243 with a portion of the produced feed water 241. The preheated portion of produced water 244 is recombined with the main preheated produced water 245 prior to entering the heated separator 250.

If the quantity of waste energy 203 for a specific heavy oil site is less than the energy required to distill the desired produced water stream 245, then a separate compressor 305 and reboiler 315 circuit is provided. The same circulating mass to vapour stream of less than 300 to near 2, less than 50% vapour or more precisely less than 10% vapour, is generated in the circulating concentrate stream exiting the reboiler at 350.

The excess steam 255 produced from the heated separator 250 is typically condensed using an external condenser 355. The energy can be transformed into building heat or other process heating where suitable. Condensed water streams 320 and 360 are collected in condensate surge vessels 325 and 365 and further combined using pumps 220, 330, and 375 to form the distilled water recycle feed water for the steam generators 125. By using the above described method, water recovery rates of greater than 85% can be realized.

If non-condensible volatiles are formed in the condensing process taking place in streams 210, 320 and 360, then the vapour can be vented automatically by means of 217, 335 and 370 respectively.

The operating pressure and corresponding temperature of the heated separator can be selected to operate over a wide range of full vacuum to less than 50 psig, more typically the pressure may be selected at slightly above or below atmospheric, 12 psia vacuum to 2 psig pressure.

Figure 13:
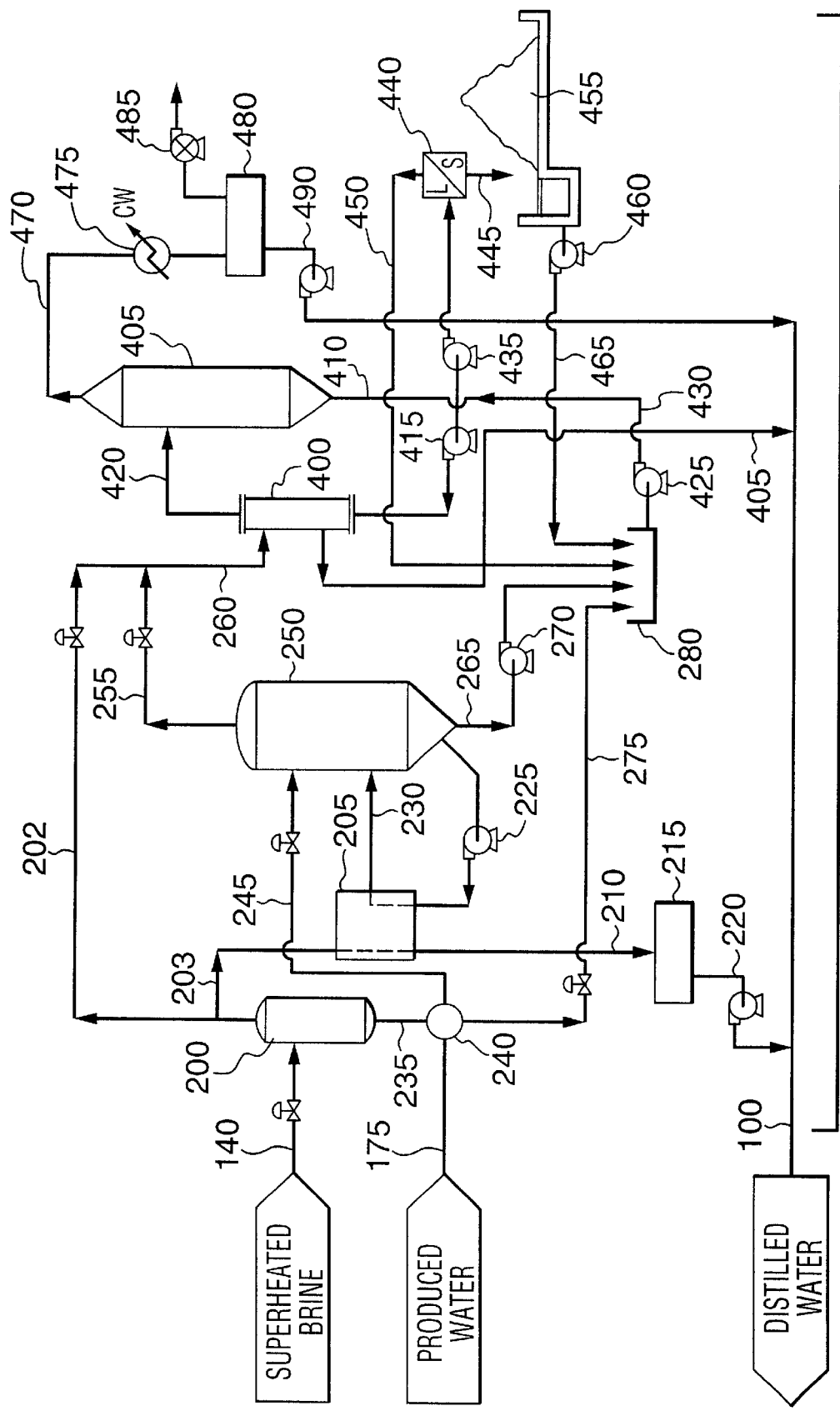
FIG. 13 is a schematic illustration of the overall process according to a further embodiment of the described invention.

Turning to FIG. 13, shown is an even further variation of the present invention. In this embodiment, a portion of the waste heat energy from 200, denoted as 202 and/or the excess steam 255 is used as the energy source for a crystallizer 405 by means of the exchanger 400 and pumping circuit 415 and 420. The crystallizer operates at a boiling condition of at least 10° F. and most desirably between 20° F. and 30° F. less than the temperature of the steam from the heated separator 250. The crystallizer may operate at pressures at, above or below atmospheric pressure. In the event that the energy in the waste energy stream 202 and/or excess steam 255 exceeds the required level for the crystallizer operation, then condensing may be conducted by an external condensing means.

The concentrated blowdown stream 275 and heated separate concentrate stream 265 are fed to the crystallizer feed tank 280. The near saturated brine is transferred by a feed pump 425 to the circulating loop of the crystallizer 410. A slip stream of the circulating slurry at 410 is removed by pump 435 and passed through a solid/liquid separation device 440 or transferred directly to an evaporation pond. A typical solid/liquid separation device, familiar to those skilled in the art, may consist of a filter, filter press, gravity settler, clarifier, cyclone, decanter tank and centrifuge.

The filtrate 450 is recycled to the crystallizer feed tank 280. Solid material 445, exiting the solid/liquid separator 440, is collected in suitable storage facilities and transported for disposal. Any excess contaminated water collected in the storage areas 455 or evaporation pond can be recycled by pump 460 back to the crystallizer feed tank 280.

Condensed water streams 210, 405 and 490 can be collected and combined to form the distilled water recycle feed water for the steam generators 125. By using the above described method, water recovery rates of 100% and zero discharge criteria can be achieved.

In terms of the apparatus employable in the system it will be readily appreciated by those skilled in the art as to what examples of the heated separators, preheaters, reboiler, pumps, compressors/blowers, crystallizers, etc., will be most desirable. Other modifications will be readily appreciated without departing from the scope of the invention.

Although the embodiments of the invention have been described above, it is not limited thereto and it will be apparent to those skilled in the art that numerous modifications form part of the present invention insofar as they do not depart from the spirit, nature and scope of the claimed and described invention.

We claim:

1. A method of recovering energy for treating water used in heavy oil recovery in a reservoir containing heavy oil and water comprising in combination, the steps of:
    a) providing a water feed stream;
    b) treating said water feed stream to generate a steam fraction and a liquid fraction;
    c) providing a steam separator for separating said steam fraction and said liquid fraction;
    d) separating said steam fraction and said liquid fraction;
    e) providing an oil-water separator and a water distillation apparatus;
    f) injecting the reservoir with said steam fraction;
    g) collecting heavy oil and produced water from the reservoir in the oil-water separator;
    h) separating said heavy oil and produced water from the separator;
    i) providing thermal energy contained in the liquid fraction to the water distillation apparatus; and
    j) treating the produced water with the water distillation apparatus.

2. The method a set forth in claim 1, wherein said water feed stream is conditioned prior to contact with said steam generator.

3. The method a set forth in claim 2, wherein said water feed stream is conditioned for mineral removal.

4. The method a set forth in claim 1, wherein said heavy oil from step h) has an API gravity of 7° to 20°.

5. The method a set forth in claim 1, further including the step of providing a heat exchanger for recovering at least a portion of said thermal energy in said liquid fraction.

6. The method a set forth in claim 5, further including the step of preheating said water feed stream with at least a portion of recovered energy from said heat exchanger.

7. The method a set forth in claim 1, wherein said heavy oil recovery comprises steam assisted gravity drain (SAGD) recovery.

8. The method a set forth in claim 1, wherein said heavy oil recovery comprises cyclic steam stimulation (CSS).

9. The method a set forth in claim 1, wherein said heavy oil recovery comprises steam and gas pushed (SAGP) recovery.

10. A method of recovering energy from a heavy oil recovery facility where said heavy oil is contained in a reservoir, said energy for the treatment of water produced from heavy oil recovery, said method comprising, the steps of:
    a) providing a source of steam having a steam fraction and a liquid fraction;
    b) providing an oil-water separator and a water distillation apparatus ;

c) injecting said reservoir with said steam fraction to recover said heavy oil;
d) collecting heavy oil and water from said reservoir in said oil-water separator;
e) separating said heavy oil and produced water from said separator;
f) providing thermal energy contained in said liquid fraction to said water distillation apparatus; and
g) treating said produced water with said water distillation apparatus.

11. A method of recovering energy for treating water used in heavy oil recovery in a reservoir containing heavy oil and water comprising in combination, the steps of:
a) providing a water feed stream;
b) treating said water feed stream to generate a steam fraction and a liquid fraction;
c) providing a steam separator for separating said steam fraction and said liquid fraction;
d) separating said steam fraction and said liquid fraction;
e) providing an oil-water separator and a water distillation apparatus;
f) injecting said reservoir with said steam fraction;
g) depressurizing heavy oil, produced water and steam exiting from said reservoir;
h) transferring energy contained in said steam by flashing to said water distillation apparatus; and
i) separating in said oil-water separator said heavy oil and produced water.

12. The method as set forth in claim 11, further including the step of providing thermal energy contained in said liquid fraction to said water distillation apparatus.

13. The method as set forth in claim 12, further including the step of treating said produced water with said water distillation apparatus.

14. A method of recovering energy for treating water used in heavy oil recovery in a reservoir containing heavy oil and water comprising in combination, the steps of:
a) providing a water feed stream;
b) treating said water feed stream to generate a steam fraction and a liquid fraction;
c) providing a steam separator for separating said steam fraction and said liquid fraction;
d) separating said steam fraction and said liquid fraction;
e) providing an oil-water separator and a water distillation apparatus;
f) injecting said reservoir with said steam fraction;
g) recovering heat energy from said heavy oil and produced water exiting said reservoir with heat exchange means;
h) separating said heavy oil and produced water;
i) providing thermal energy from said heat exchange means to said water distillation apparatus
j) providing thermal energy contained in said liquid fraction to said water distillation apparatus; and
k) treating said produced water with said water distillation apparatus.

* * * * *